United States Patent
Cotoros et al.

(10) Patent No.: US 12,001,075 B2
(45) Date of Patent: Jun. 4, 2024

(54) LENS STACK WITH REPLACEABLE OUTER LENS

(71) Applicant: GoPro, Inc., San Mateo, CA (US)

(72) Inventors: Ingrid Cotoros, San Mateo, CA (US); Ian Griggs, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 777 days.

(21) Appl. No.: 17/102,913

(22) Filed: Nov. 24, 2020

(65) Prior Publication Data
US 2021/0173167 A1 Jun. 10, 2021

Related U.S. Application Data

(63) Continuation of application No. PCT/US2019/034804, filed on May 31, 2019.
(Continued)

(51) Int. Cl.
*G02B 7/02* (2021.01)
*G02B 3/00* (2006.01)
(Continued)

(52) U.S. Cl.
CPC .............. *G02B 7/021* (2013.01); *G02B 3/00* (2013.01); *G02B 7/025* (2013.01); *G02B 7/026* (2013.01);
(Continued)

(58) Field of Classification Search
CPC .......... G02B 7/021; G02B 3/00; G02B 7/025; G02B 7/026; G02B 7/14;
(Continued)

(56) References Cited

U.S. PATENT DOCUMENTS

| | | | | |
|---|---|---|---|---|
| 4,519,691 A | * | 5/1985 | Yamada | G02B 7/08 352/140 |
| 4,586,787 A | * | 5/1986 | Fiandra | G02B 7/026 359/830 |

(Continued)

FOREIGN PATENT DOCUMENTS

| | | | | |
|---|---|---|---|---|
| CN | 204731514 U | | 10/2015 | |
| KR | 20100068223 A | * | 6/2010 | ............. H04N 23/00 |

(Continued)

OTHER PUBLICATIONS

International Preliminary Report on Patentability for App. No. PCT/US2019/034804 dated Dec. 10, 2020, 6 pages.
(Continued)

*Primary Examiner* — Timothy J Henn
(74) *Attorney, Agent, or Firm* — Young Basile Hanlon & MacFarlane, P.C.

(57) ABSTRACT

Systems and methods are disclosed for replaceable outer lenses. For example, an image capture device may include a lens barrel in a body of the image capture device, the lens barrel including multiple inner lenses; a replaceable lens structure that is mountable on the body of the image capture device, the replaceable lens structure including an outer lens and a retaining ring configured to fasten the outer lens in a position covering a first end the lens barrel in a first arrangement and configured to disconnect the outer lens from the body of the image capture device in a second arrangement; and an image sensor mounted within the body at a second end of the lens barrel, the image sensor configured to capture images based on light incident on the image sensor through the outer lens and the multiple inner lenses when the retaining ring is in the first arrangement.

20 Claims, 13 Drawing Sheets

Related U.S. Application Data

(60) Provisional application No. 62/678,939, filed on May 31, 2018.

(51) Int. Cl.
  G02B 7/14 (2021.01)
  H04N 23/54 (2023.01)
  H04N 23/55 (2023.01)

(52) U.S. Cl.
  CPC .............. G02B 7/14 (2013.01); H04N 23/54 (2023.01); H04N 23/55 (2023.01); *G02B 2003/0093* (2013.01)

(58) Field of Classification Search
  CPC .. G02B 2003/0093; G02B 13/06; G02B 7/02; H04N 23/54; H04N 23/55
  See application file for complete search history.

(56) References Cited

U.S. PATENT DOCUMENTS

| | | | |
|---|---|---|---|
| 4,723,833 A | 2/1988 | Yamada | |
| 5,052,782 A * | 10/1991 | Myer | G02B 7/026 359/830 |
| 5,177,641 A * | 1/1993 | Kobayashi | G02B 7/026 359/830 |
| 5,249,082 A | 9/1993 | Newman | |
| 6,144,509 A * | 11/2000 | Baker | G02B 7/026 359/830 |
| 2004/0120701 A1 | 6/2004 | Dirisio | |
| 2004/0223074 A1* | 11/2004 | Takada | H04N 23/54 348/360 |
| 2007/0171550 A1* | 7/2007 | Kuroda | G02B 7/02 359/811 |
| 2007/0297790 A1* | 12/2007 | Kogure | G03B 11/041 396/504 |
| 2012/0327663 A1* | 12/2012 | Doan | F21K 9/232 362/294 |
| 2013/0177304 A1* | 7/2013 | Chapman | G03B 17/565 396/533 |

FOREIGN PATENT DOCUMENTS

| | | |
|---|---|---|
| RU | 2257600 C1 | 7/2005 |
| SU | 1335255 A1 | 9/1987 |

OTHER PUBLICATIONS

International Search Report for Application No. PCT/US2019/034804, dated Sep. 26, 2019, 8 pages.

* cited by examiner

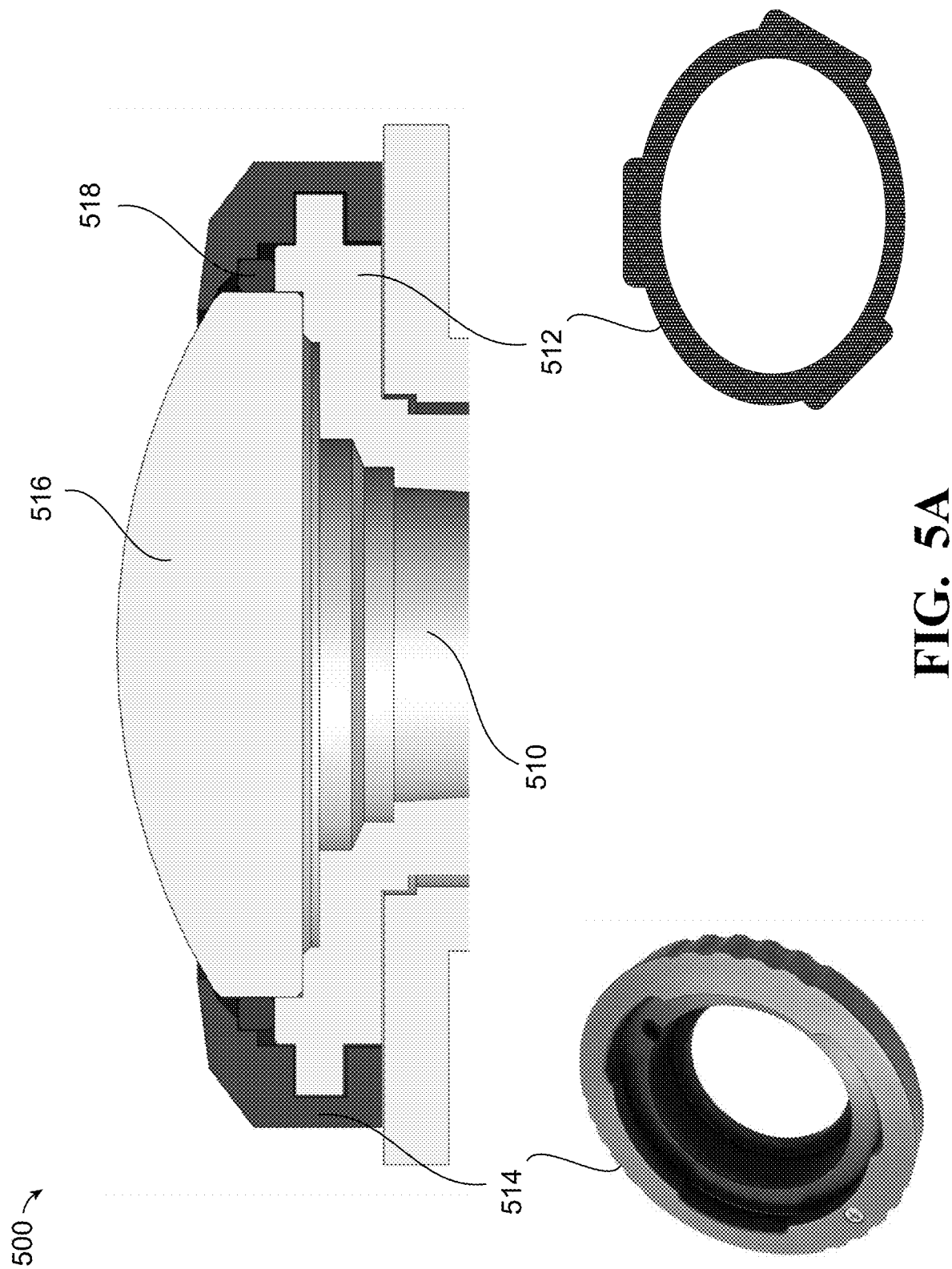

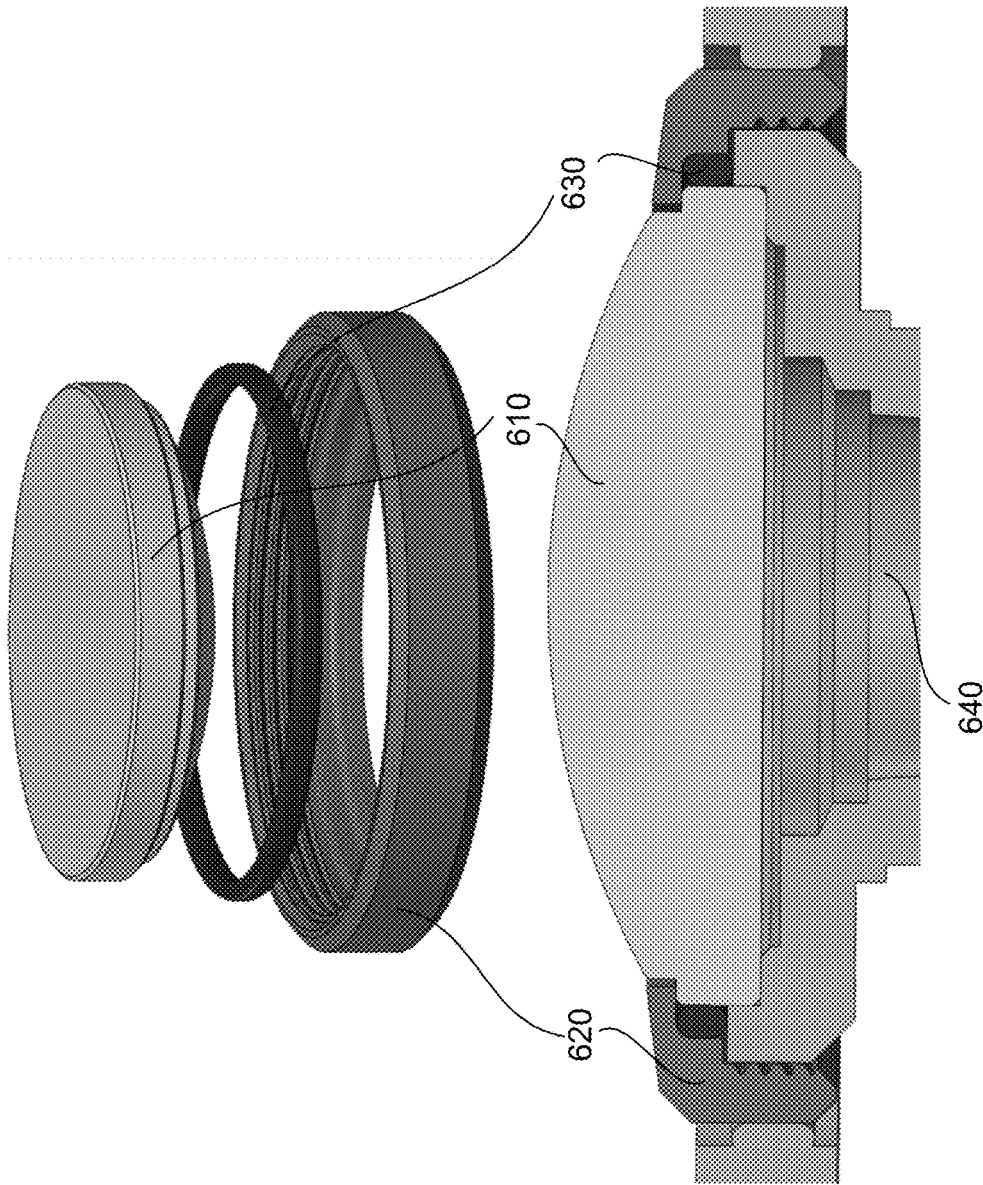

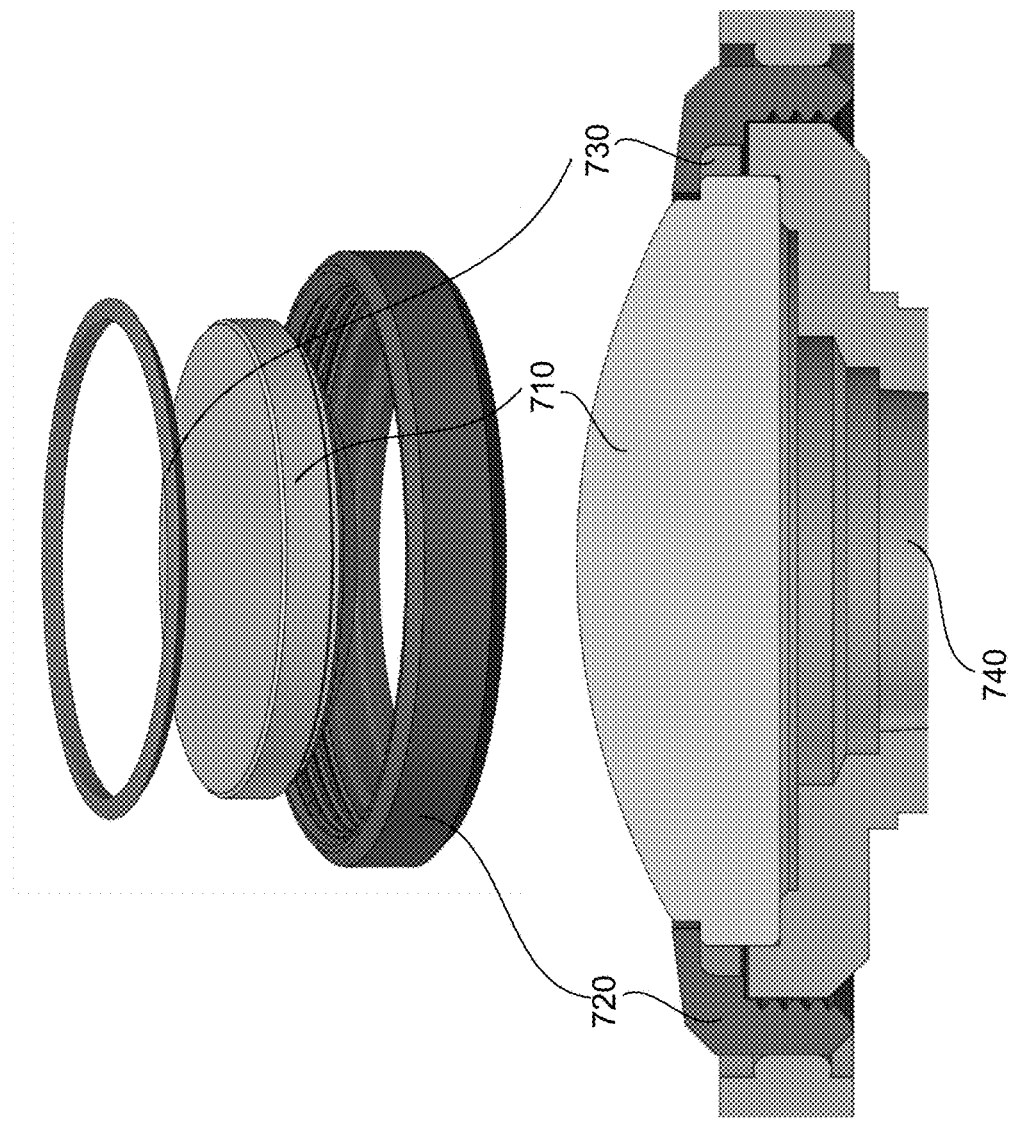

LENS STACK WITH REPLACEABLE OUTER LENS

CROSS REFERENCE TO RELATED APPLICATION(S)

This application is a continuation of International Application No. PCT/US2019/034804, filed on May 31, 2019, which claims the benefit of U.S. Provisional Patent Application No. 62/678,939 filed on May 31, 2018, both of which the contents are incorporated by reference herein.

TECHNICAL FIELD

The present disclosure relates to replaceable outer lenses.

BACKGROUND

Image capture devices, such as cameras, may capture content as images (e.g., still images or frames of video). Light may be received and focused via a lens and may be converted to an electronic image signal by an image sensor. The image signal may be processed by an image signal processor (ISP) to form an image, which may be stored and/or encoded. In some implementations, multiple images or video frames may include spatially adjacent or overlapping content. An outer lens may be subject to scratching, cracks, or other damage from impacts during use of an image capture device, which may cause optical distortion and degradation of quality of captured images. For example, lenses supporting a wide field of view (e.g., a fisheye les) may protrude from the body of an image capture device, and thus be particularly vulnerable to impact damage.

SUMMARY

The present disclosure describes, inter alia, apparatus and methods for replaceable outer lenses.

In a first aspect, the subject matter described in this specification can be embodied in image capture devices that include a lens barrel in a body of the image capture device, the lens barrel including multiple inner lenses; a replaceable lens structure that is mountable on the body of the image capture device, the replaceable lens structure including an outer lens and a retaining ring configured to fasten the outer lens in a position covering a first end the lens barrel in a first arrangement and configured to disconnect the outer lens from the body of the image capture device in a second arrangement; and an image sensor mounted within the body at a second end of the lens barrel, and configured to capture images based on light incident on the image sensor through the outer lens and the multiple inner lenses when the retaining ring is in the first arrangement.

In the first aspect, the outer lens may be a curved lens. In the first aspect, the outer lens may be a fisheye lens. In the first aspect, the retaining ring may be glued to the outer lens. In the first aspect, the outer lens may be secured in the retaining ring as a captured mount, such that the outer lens may be rotated within the retaining ring. In in some implementations of the first aspect, at least one of the multiple inner lenses is a curved lens. In the first aspect, the retaining ring may include a bayonet mechanism configured to facilitate transition between the first arrangement and the second arrangement. In the first aspect, the retaining ring may include a threaded mechanism configured to facilitate transition between the first arrangement and the second arrangement. In the first aspect, the retaining ring may include a snap-ring mechanism configured to facilitate transition between the first arrangement and the second arrangement. In the first aspect, the retaining ring may include screw holes that enable screws to fasten the retaining ring to the body in the first arrangement. In the first aspect, the image capture device may include a waterproofing O-ring that is positioned radially around the outer lens. In the first aspect, the image capture device may include a waterproofing O-ring that is positioned inside the outer lens, between the outer lens and the lens barrel. The first aspect may include any combination of the features described in this paragraph.

In a second aspect, the subject matter described in this specification can be embodied in image capture devices that include a lens barrel in a body of the image capture device, the lens barrel including a curved inner lens; a replaceable lens structure that is mountable on the body of the image capture device, the replaceable lens structure including an outer lens and a retaining ring configured to fasten the outer lens in a position covering a first end the lens barrel in a first arrangement and configured to disconnect the outer lens from the body of the image capture device in a second arrangement; and an image sensor mounted within the body at a second end of the lens barrel, and configured to capture images based on light incident on the image sensor through the outer lens and the curved inner lens when the retaining ring is in the first arrangement.

In the second aspect, the outer lens may be a curved lens. In the second aspect, the outer lens may be a fisheye lens. In the second aspect, the retaining ring may be glued to the outer lens. In the second aspect, the outer lens may be secured in the retaining ring as a captured mount, such that the outer lens may be rotated within the retaining ring. In the second aspect, the retaining ring may include a bayonet mechanism configured to facilitate transition between the first arrangement and the second arrangement. In the second aspect, the retaining ring may include a threaded mechanism configured to facilitate transition between the first arrangement and the second arrangement. In the second aspect, the retaining ring may include a snap-ring mechanism configured to facilitate transition between the first arrangement and the second arrangement. In the second aspect, the retaining ring may include screw holes that enable screws to fasten the retaining ring to the body in the first arrangement. In the second aspect, the image capture device may include a waterproofing O-ring that is positioned radially around the outer lens. In the second aspect, the image capture device may include a waterproofing O-ring that is positioned inside the outer lens, between the outer lens and the lens barrel. The second aspect may include any combination of the features described in this paragraph.

In a third aspect, the subject matter described in this specification can be embodied in methods that include disconnecting a first retaining ring from a body of an image capture device to remove a first outer lens from a position covering a first end of a lens barrel, the lens barrel including multiple inner lenses; and connecting a second retaining ring to the body of the image capture device to mount a second outer lens in a position covering the first end the lens barrel, in which an image sensor is mounted within the body at a second end of the lens barrel and configured to capture images based on light incident on the image sensor through the second outer lens and the multiple inner lenses.

In the third aspect, the first outer lens may be a curved lens. In the third aspect, the second outer lens may be a curved lens. In the third aspect, the first outer lens may be a fisheye lens. In the third aspect, the second outer lens may be a fisheye lens. In the third aspect, the first retaining ring may be glued to the first outer lens. In the third aspect, the second retaining ring may be glued to the second outer lens. In the third aspect, the first outer lens may be secured in the first retaining ring as a captured mount, such that the first outer lens may be rotated within the first retaining ring. In the third aspect, the second outer lens may be secured in the second retaining ring as a captured mount, such that the second outer lens may be rotated within the second retaining ring. In in some implementations of the third aspect, at least one of the multiple inner lenses is a curved lens. In the third aspect, the first retaining ring may include a bayonet mechanism configured to facilitate disconnecting the first retaining ring from the body of the image capture device. In the third aspect, the first retaining ring may include a threaded mechanism configured to facilitate disconnecting the first retaining ring from the body of the image capture device. In the third aspect, the first retaining ring may include a snap-ring mechanism configured to facilitate disconnecting the first retaining ring from the body of the image capture device. In the third aspect, the first retaining ring may include screw holes that enable screws to fasten the first retaining ring to the body of the image capture device. In the third aspect, the second retaining ring may include a bayonet mechanism configured to facilitate connecting the second retaining ring to the body of the image capture device. In the third aspect, the second retaining ring may include a threaded mechanism configured to facilitate connecting the second retaining ring to the body of the image capture device. In the third aspect, the second retaining ring may include a snap-ring mechanism configured to facilitate connecting the second retaining ring to the body of the image capture device. In the third aspect, the second retaining ring may include screw holes that enable screws to fasten the second retaining ring to the body of the image capture device. The third aspect may include any combination of the features described in this paragraph.

These and other aspects of the present disclosure are disclosed in the following detailed description, the appended claims, and the accompanying figures.

BRIEF DESCRIPTION OF THE DRAWINGS

The disclosed embodiments have other advantages and features which will be more readily apparent from the detailed description, the appended claims, and the accompanying figures. A brief introduction of the figures is below.

FIG. 5A illustrates an example of an interchangeable lens structure including a bayonet mechanism.

FIG. 6A illustrates an exploded view of an example of an interchangeable lens structure with radial O-ring.

FIG. 6B illustrates a side view of an example of an interchangeable lens structure with radial O-ring.

FIG. 7A illustrates an exploded view of an example of an interchangeable lens structure with radial glue.

FIG. 7B illustrates a side view of an example of an interchangeable lens structure with radial glue.

DETAILED DESCRIPTION

Figure 1:
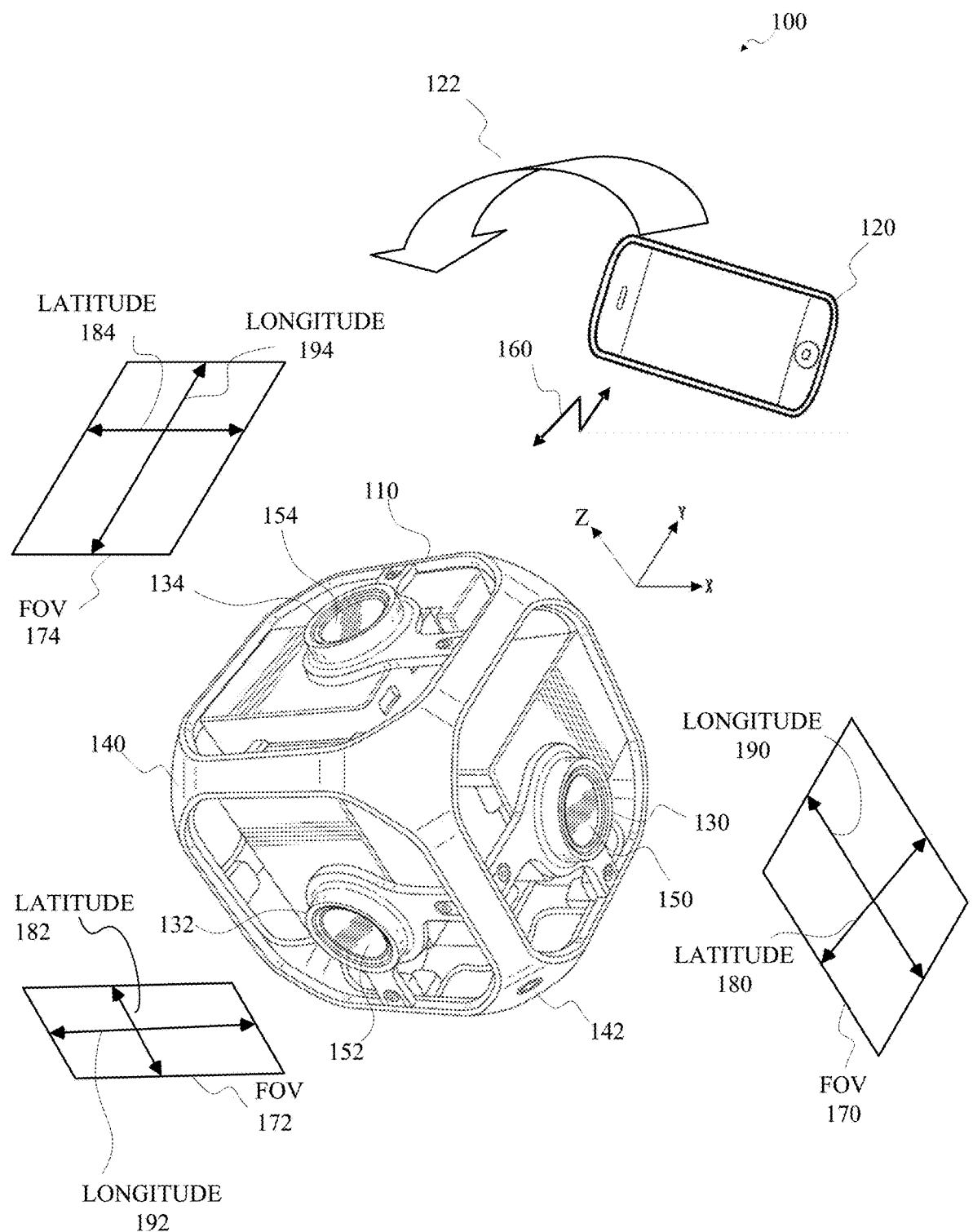
FIG. 1 is a diagram of an example of an image capture system for content capture.

Systems and methods for replaceable outer lenses are described below. Wide field of view lenses (e.g., hyperhemispherical lenses) often cannot be afforded the protection of a flat lens cover due to the field of view they need to cover. However, wide field of view lenses do scratch and suffer impact damage just like all other lenses. Without a mechanism to protect them or allow to repair/service/replacement of these lenses, the image quality afforded by an image capture device (e.g., a camera) could degrade significantly with the lens damage occurs during use of the image capture device, which may render the image capture device unusable. Interchangeable outer lens structures are described herein that facilitate maintenance operations needed to preserve the image quality of a lens assembly within acceptable specifications.

Different techniques may be used to align replaceable outer lens with the optics (e.g., one or more inner lenses) of a lens barrel and/or an image sensor at the other end of the lens barrel. For example, press-fit, transition-fit, clearance-fit, conical, and/or threaded techniques may be used for alignment of an outer lens. Different mechanisms can be used for fastening an outer lens in a position covering an end of a lens barrel, such as screw thread, bayonet, and/or snap-in mechanisms. Different techniques may be employed for assembly of an interchangeable lens structure, such as a 1-piece snap-in lens, a retaining ring clamping a lens in position with a friction lock by fastening the retaining ring to a lens barrel or another part of a body of image capture device, a retaining ring mounted (e.g., using glue) to an outer lens, an outer lens mounted to a flange and a retaining ring, an outer lens mounted to a retaining ring and a lens barrel retention insert (e.g., including threads), or an outer lens mounted to a flange, a retaining ring, and a lens barrel retention insert.

The system and methods for replaceable outer lenses are described herein may provide advantages, such as saving the cost of replacing a lens barrel with inner lenses and when an outer lens has to be replaced due to scratches or other damage, and/or improving the captured image quality after an outer lens replacement by keeping a lens barrel with inner lenses in consistent alignment with an image sensor.

As used herein, the term "curved lens" refers to a lens (e.g., a plastic of glass lens) with substantial curvature of an optical surface that is used to focus light incident through the lens. For example, a curved lens may include a portion of an optical surface having a radius of curvature that is less than ten times the width or diameter of the optical surface.

Implementations are described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIG. 1 is a diagram of an example of an image capture system 100 for content capture. As shown in FIG. 1, an image capture system 100 may include an image capture apparatus 110, an external user interface (UI) device 120, or a combination thereof.

In some implementations, the image capture apparatus 110 may be a multi-face apparatus and may include multiple image capture devices, such as image capture devices 130, 132, 134 as shown in FIG. 1, arranged in a structure 140, such as a cube-shaped cage as shown. Although three image capture devices 130, 132, 134 are shown for simplicity in FIG. 1, the image capture apparatus 110 may include any number of image capture devices. For example, the image capture apparatus 110 shown in FIG. 1 may include six cameras, which may include the three image capture devices 130, 132, 134 shown and three cameras not shown.

In some implementations, the structure 140 may have dimensions, such as between 25 mm and 150 mm. For example, the length of each side of the structure 140 may be 105 mm. The structure 140 may include a mounting port 142, which may be removably attachable to a supporting structure, such as a tripod, a photo stick, or any other camera mount (not shown). The structure 140 may be a rigid support structure, such that the relative orientation of the image capture devices 130, 132, 134 of the image capture apparatus 110 may be maintained in relatively static or fixed alignment, except as described herein.

The image capture apparatus 110 may obtain, or capture, image content, such as images, video, or both, with a 360° field-of-view, which may be referred to herein as panoramic or spherical content. For example, each of the image capture devices 130, 132, 134 may include respective lenses, for receiving and focusing light, and respective image sensors for converting the received and focused light to an image signal, such as by measuring or sampling the light, and the multiple image capture devices 130, 132, 134 may be arranged such that respective image sensors and lenses capture a combined field-of-view characterized by a spherical or near spherical field-of-view.

In some implementations, each of the image capture devices 130, 132, 134 may have a respective field-of-view 170, 172, 174, such as a field-of-view 170, 172, 174 that 90° in a latitudinal dimension 180, 182, 184 and includes 120° in a longitudinal dimension 190, 192, 194. In some implementations, image capture devices 130, 132, 134 having overlapping fields-of-view 170, 172, 174, or the image sensors thereof, may be oriented at defined angles, such as at 90°, with respect to one another. In some implementations, the image sensor of the image capture device 130 is directed along the X axis, the image sensor of the image capture device 132 is directed along the Y axis, and the image sensor of the image capture device 134 is directed along the Z axis. The respective fields-of-view 170, 172, 174 for adjacent image capture devices 130, 132, 134 may be oriented to allow overlap for a stitching function. For example, the longitudinal dimension 190 of the field-of-view 170 for the image capture device 130 may be oriented at 90° with respect to the latitudinal dimension 184 of the field-of-view 174 for the image capture device 134, the latitudinal dimension 180 of the field-of-view 170 for the image capture device 130 may be oriented at 90° with respect to the longitudinal dimension 192 of the field-of-view 172 for the image capture device 132, and the latitudinal dimension 182 of the field-of-view 172 for the image capture device 132 may be oriented at 90° with respect to the longitudinal dimension 194 of the field-of-view 174 for the image capture device 134.

The image capture apparatus 110 shown in FIG. 1 may have 420° angular coverage in vertical and/or horizontal planes by the successive overlap of 90°, 120°, 90°, 120° respective fields-of-view 170, 172, 174 (not all shown) for four adjacent image capture devices 130, 132, 134 (not all shown). For example, fields-of-view 170, 172 for the image capture devices 130, 132 and fields-of-view (not shown) for two image capture devices (not shown) opposite the image capture devices 130, 132 respectively may be combined to provide 420° angular coverage in a horizontal plane. In some implementations, the overlap between fields-of-view of image capture devices 130, 132, 134 having a combined field-of-view including less than 360° angular coverage in a vertical and/or horizontal plane may be aligned and merged or combined to produce a panoramic image. For example, the image capture apparatus 110 may be in motion, such as rotating, and source images captured by at least one of the image capture devices 130, 132, 134 may be combined to form a panoramic image. As another example, the image capture apparatus 110 may be stationary, and source images captured contemporaneously by each image capture device 130, 132, 134 may be combined to form a panoramic image.

In some implementations, an image capture device 130, 132, 134 may include a lens 150, 152, 154 or other optical element. An optical element may include one or more lens, macro lens, zoom lens, special-purpose lens, telephoto lens, prime lens, achromatic lens, apochromatic lens, process lens, rectilinear lens, wide-angle lens, ultra-wide-angle lens, spherical lens, fisheye lens, infrared lens, ultraviolet lens, perspective control lens, other lens, and/or other optical element. In some implementations, a lens 150, 152, 154 may be a rectilinear lens and produce rectilinear field-of-view images. In some implementations, a lens 150, 152, 154 may be a fisheye lens and produce fisheye, or near-fisheye, field-of-view images. For example, the respective lenses 150, 152, 154 of the image capture devices 130, 132, 134 may be fisheye lenses. In some implementations, images captured by two or more image capture devices 130, 132, 134 of the image capture apparatus 110 may be combined by stitching or merging fisheye projections of the captured images to produce an equirectangular planar image. For example, a first fisheye image may be a round or elliptical image, and may be transformed to a first rectangular image, a second fisheye image may be a round or elliptical image, and may be transformed to a second rectangular image, and the first and second rectangular images may be arranged side-by-side, which may include overlapping, and stitched together to form the equirectangular planar image.

An image capture device 130, 132, 134 may include replaceable lens structures that allow an outer lens 150, 152, 154 of an image capture device to be replaced without replacing the underlying lens barrel that includes one or more inner lenses which may be curved. For example, the outer lens 150 may be part of an interchangeable lens structure (e.g., the interchangeable lens structure 500 of FIG. 5A).

Although not expressly shown in FIG. 1, In some implementations, an image capture device 130, 132, 134 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, in some implementations, an image capture apparatus 110 may include one or more microphones, which may receive, capture, and record audio information, which may be associated with images acquired by the image sensors.

Although not expressly shown in FIG. 1, the image capture apparatus 110 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

In some implementations, the image capture apparatus 110 may interface with or communicate with an external device, such as the external user interface (UI) device 120, via a wired (not shown) or wireless (as shown) computing communication link 160. Although a single computing communication link 160 is shown in FIG. 1 for simplicity, any number of computing communication links may be used. Although the computing communication link 160 shown in FIG. 1 is shown as a direct computing communication link, an indirect computing communication link, such as a link including another device or a network, such as the internet, may be used. In some implementations, the computing communication link 160 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 160 may be an HDMI link, a USB link, a digital video interface link, a display port interface link, such as a Video Electronics Standards Association (VESA) digital display interface link, an Ethernet link, a Thunderbolt link, and/or other wired computing communication link.

In some implementations, the user interface device 120 may be a computing device, such as a smartphone, a tablet computer, a phablet, a smart watch, a portable computer, and/or another device or combination of devices configured to receive user input, communicate information with the image capture apparatus 110 via the computing communication link 160, or receive user input and communicate information with the image capture apparatus 110 via the computing communication link 160.

In some implementations, the image capture apparatus 110 may transmit images, such as panoramic images, or portions thereof, to the user interface device 120 via the computing communication link 160, and the user interface device 120 may store, process, display, or a combination thereof the panoramic images.

In some implementations, the user interface device 120 may display, or otherwise present, content, such as images or video, acquired by the image capture apparatus 110. For example, a display of the user interface device 120 may be a viewport into the three-dimensional space represented by the panoramic images or video captured or created by the image capture apparatus 110.

In some implementations, the user interface device 120 may communicate information, such as metadata, to the image capture apparatus 110. For example, the user interface device 120 may send orientation information of the user interface device 120 with respect to a defined coordinate system to the image capture apparatus 110, such that the image capture apparatus 110 may determine an orientation of the user interface device 120 relative to the image capture apparatus 110. Based on the determined orientation, the image capture apparatus 110 may identify a portion of the panoramic images or video captured by the image capture apparatus 110 for the image capture apparatus 110 to send to the user interface device 120 for presentation as the viewport. In some implementations, based on the determined orientation, the image capture apparatus 110 may determine the location of the user interface device 120 and/or the dimensions for viewing of a portion of the panoramic images or video.

In an example, a user may rotate (sweep) the user interface device 120 through an arc or path 122 in space, as indicated by the arrow shown at 122 in FIG. 1. The user interface device 120 may communicate display orientation information to the image capture apparatus 110 using a communication interface such as the computing communication link 160. The image capture apparatus 110 may provide an encoded bitstream to enable viewing of a portion of the panoramic content corresponding to a portion of the environment of the display location as the image capture apparatus 110 traverses the path 122. Accordingly, display orientation information from the user interface device 120 may be transmitted to the image capture apparatus 110 to control user selectable viewing of captured images and/or video.

In some implementations, the image capture apparatus 110 may communicate with one or more other external devices (not shown) via wired or wireless computing communication links (not shown).

In some implementations, data, such as image data, audio data, and/or other data, obtained by the image capture apparatus 110 may be incorporated into a combined multimedia stream. For example, the multimedia stream may include a video track and/or an audio track. As another example, information from various metadata sensors and/or sources within and/or coupled to the image capture apparatus 110 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata and/or other parameters. In some implementations, a multiplexed stream may be generated to incorporate a video and/or audio track and one or more metadata tracks.

In some implementations, the user interface device 120 may implement or execute one or more applications, such as GoPro Studio, GoPro App, or both, to manage or control the image capture apparatus 110. For example, the user interface device 120 may include an application for controlling camera configuration, video acquisition, video display, or any other configurable or controllable aspect of the image capture apparatus 110.

In some implementations, the user interface device 120, such as via an application (e.g., GoPro App), may generate and share, such as via a cloud-based or social media service, one or more images, or short video clips, such as in response to user input.

In some implementations, the user interface device 120, such as via an application (e.g., GoPro App), may remotely control the image capture apparatus 110, such as in response to user input.

In some implementations, the user interface device 120, such as via an application (e.g., GoPro App), may display unprocessed or minimally processed images or video captured by the image capture apparatus 110 contemporaneously with capturing the images or video by the image capture apparatus 110, such as for shot framing, which may be referred to herein as a live preview, and which may be performed in response to user input.

In some implementations, the user interface device 120, such as via an application (e.g., GoPro App), may mark one or more key moments contemporaneously with capturing the images or video by the image capture apparatus 110, such as with a HiLight Tag, such as in response to user input.

In some implementations, the user interface device 120, such as via an application (e.g., GoPro App), may display, or otherwise present, marks or tags associated with images or video, such as HiLight Tags, such as in response to user input. For example, marks may be presented in a GoPro Camera Roll application for location review and/or playback of video highlights.

In some implementations, the user interface device 120, such as via an application (e.g., GoPro App), may wirelessly control camera software, hardware, or both. For example, the user interface device 120 may include a web-based graphical interface accessible by a user for selecting a live or previously recorded video stream from the image capture apparatus 110 for display on the user interface device 120.

In some implementations, the user interface device 120 may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture apparatus 110.

Figure 2:
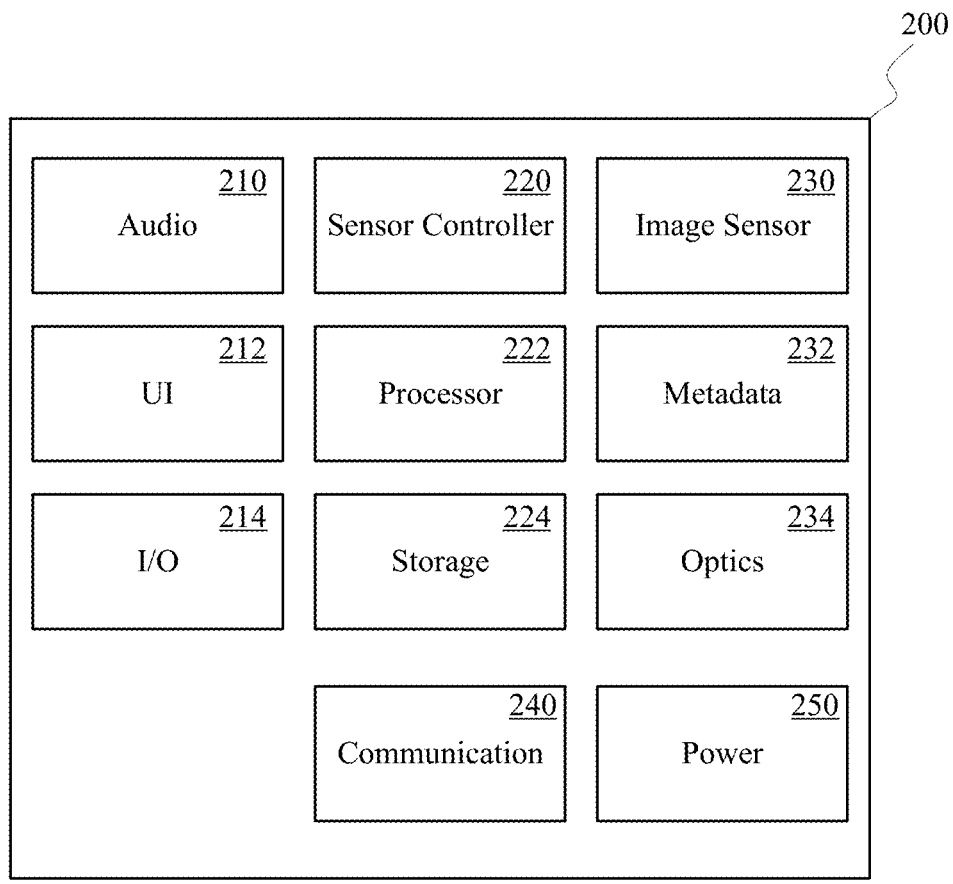
FIG. 2 is a block diagram of an example of an image capture device.

FIG. 2 is a block diagram of an example of an image capture device 200 in accordance with implementations of this disclosure. In some implementations, an image capture device 200, such as one of the image capture devices 130, 132, 134 shown in FIG. 1, which may be an action camera, may include an audio component 210, a user interface (UI) unit 212, an input/output (I/O) unit 214, a sensor controller 220, a processor 222, an electronic storage unit 224, an image sensor 230, a metadata unit 232, an optics unit 234, a communication unit 240, a power system 250, or a combination thereof.

In some implementations, the audio component 210, which may include a microphone, may receive, sample, capture, record, or a combination thereof audio information, such as sound waves, which may be associated with, such as stored in association with, image or video content contemporaneously captured by the image capture device 200. In some implementations, audio information may be encoded using, e.g., Advanced Audio Coding (AAC), Audio Compression—3 (AC3), Moving Picture Experts Group Layer-3 Audio (MP3), linear Pulse Code Modulation (PCM), Motion Picture Experts Group—High efficiency coding and media delivery in heterogeneous environments (MPEG-H), and/or other audio coding formats (audio codecs). In one or more implementations of spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

In some implementations, the user interface unit 212 may include one or more units that may register or receive input from and/or present outputs to a user, such as a display, a touch interface, a proximity sensitive interface, a light receiving/emitting unit, a sound receiving/emitting unit, a wired/wireless unit, and/or other units. In some implementations, the user interface unit 212 may include a display, one or more tactile elements (e.g., buttons and/or virtual touch screen buttons), lights (LEDs), speakers, and/or other user interface elements. The user interface unit 212 may receive user input and/or provide information to a user related to the operation of the image capture device 200.

In some implementations, the user interface unit 212 may include a display unit that presents information related to camera control or use, such as operation mode information (e.g., image resolution, frame rate, capture mode, sensor mode, video mode, photo mode), connection status information (e.g., connected, wireless, wired connection), power mode information (e.g., standby mode, sensor mode, video mode), information related to other information sources (e.g., heart rate, GPS), and/or other information.

In some implementations, the user interface unit 212 may include a user interface component such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press (pulse width modulation), a number of button presses (pulse code modulation), or a combination thereof. In an example, a sensor acquisition mode may be initiated in response to detecting two short button presses. In another example, the initiation of a video mode and cessation of a photo mode, or the initiation of a photo mode and cessation of a video mode, may be triggered (toggled) in response to a single short button press. In another example, video or photo capture for a given time duration or a number of frames (burst capture) may be triggered in response to a single short button press. Other user command or communication implementations may also be implemented, such as one or more short or long button presses.

In some implementations, the I/O unit 214 may synchronize the image capture device 200 with other cameras and/or with other external devices, such as a remote control, a second image capture device, a smartphone, a user interface device, such as the user interface device 120 shown in FIG. 1, and/or a video server. The I/O unit 214 may communicate information between I/O components. In some implementations, the I/O unit 214 may be connected to the communication unit 240 to provide a wired and/or wireless communications interface (e.g., Wi-Fi, Bluetooth, USB, HDMI, Wireless USB, Near Field Communication (NFC), Ethernet, a radio frequency transceiver, and/or other interfaces) for communication with one or more external devices, such as a user interface device, such as the user interface device 120 shown in FIG. 1, or another metadata source. In some implementations, the I/O unit 214 may interface with LED lights, a display, a button, a microphone, speakers, and/or other I/O components. In some implementations, the I/O unit 214 may interface with an energy source, e.g., a battery, and/or a Direct Current (DC) electrical source.

In some implementations, the I/O unit 214 of the image capture device 200 may include one or more connections to external computerized devices for configuration and/or management of remote devices, as described herein. The I/O unit 214 may include any of the wireless or wireline interfaces described herein, and/or may include customized or proprietary connections for specific applications.

In some implementations, the sensor controller 220 may operate or control the image sensor 230, such as in response to input, such as user input. In some implementations, the sensor controller 220 may receive image and/or video input from the image sensor 230 and may receive audio information from the audio component 210.

In some implementations, the processor 222 may include a system on a chip (SOC), microcontroller, microprocessor, CPU, DSP, application-specific integrated circuit (ASIC), GPU, and/or other processor that may control the operation and functionality of the image capture device 200. In some implementations, the processor 222 may interface with the sensor controller 220 to obtain and process sensory information for, e.g., object detection, face tracking, stereo vision, and/or other image processing.

In some implementations, the sensor controller 220, the processor 222, or both may synchronize information received by the image capture device 200. For example, timing information may be associated with received sensor data, and metadata information may be related to content (photo/video) captured by the image sensor 230 based on the timing information. In some implementations, the metadata capture may be decoupled from video/image capture. For example, metadata may be stored before, after, and in-between the capture, processing, or storage of one or more video clips and/or images.

In some implementations, the sensor controller 220, the processor 222, or both may evaluate or process received metadata and may generate other metadata information. For example, the sensor controller 220 may integrate the received acceleration information to determine a velocity profile for the image capture device 200 concurrent with recording a video. In some implementations, video information may include multiple frames of pixels and may be encoded using an encoding method (e.g., H.265, H.264, CineForm, and/or other codec).

Although not shown separately in FIG. 2, one or more of the audio component 210, the user interface unit 212, the I/O unit 214, the sensor controller 220, the processor 222, the electronic storage unit 224, the image sensor 230, the metadata unit 232, the optics unit 234, the communication unit 240, or the power systems 250 of the image capture device 200 may communicate information, power, or both with one or more other units, such as via an electronic communication pathway, such as a system bus. For example, the processor 222 may interface with the audio component 210, the user interface unit 212, the I/O unit 214, the sensor controller 220, the electronic storage unit 224, the image sensor 230, the metadata unit 232, the optics unit 234, the communication unit 240, or the power systems 250 via one or more driver interfaces and/or software abstraction layers. In some implementations, one or more of the units shown in FIG. 2 may include a dedicated processing unit, memory unit, or both (not shown). In some implementations, one or more components may be operable by one or more other control processes. For example, a GPS receiver may include a processing apparatus that may provide position and/or motion information to the processor 222 in accordance with a defined schedule (e.g., values of latitude, longitude, and elevation at 10 Hz).

In some implementations, the electronic storage unit 224 may include a system memory module that may store executable computer instructions that, when executed by the processor 222, perform various functionalities including those described herein. For example, the electronic storage unit 224 may be a non-transitory computer-readable storage medium, which may include executable instructions, and a processor, such as the processor 222 may execute the instruction to perform one or more, or portions of one or more, of the operations described herein. The electronic storage unit 224 may include storage memory for storing content (e.g., metadata, images, audio) captured by the image capture device 200.

In some implementations, the electronic storage unit 224 may include non-transitory memory for storing configuration information and/or processing code for video information and metadata capture, and/or to produce a multimedia stream that may include video information and metadata in accordance with the present disclosure. In some implementations, the configuration information may include capture type (video, still images), image resolution, frame rate, burst setting, white balance, recording configuration (e.g., loop mode), audio track configuration, and/or other parameters that may be associated with audio, video, and/or metadata capture. In some implementations, the electronic storage unit 224 may include memory that may be used by other hardware/firmware/software elements of the image capture device 200.

In some implementations, the image sensor 230 may include one or more of a charge-coupled device sensor, an active pixel sensor, a complementary metal-oxide semiconductor sensor, an N-type metal-oxide-semiconductor sensor, and/or another image sensor or combination of image sensors. In some implementations, the image sensor 230 may be controlled based on control signals from a sensor controller 220.

The image sensor 230 may sense or sample light waves gathered by the optics unit 234 and may produce image data or signals. The image sensor 230 may generate an output signal conveying visual information regarding the objects or other content corresponding to the light waves received by the optics unit 234. The visual information may include one or more of an image, a video, and/or other visual information.

In some implementations, the image sensor 230 may include a video sensor, an acoustic sensor, a capacitive sensor, a radio sensor, a vibrational sensor, an ultrasonic sensor, an infrared sensor, a radar sensor, a Light Detection And Ranging (LIDAR) sensor, a sonar sensor, or any other sensory unit or combination of sensory units capable of detecting or determining information in a computing environment.

In some implementations, the metadata unit 232 may include sensors such as an IMU, which may include one or more accelerometers and/or gyroscopes, a magnetometer, a compass, a GPS sensor, an altimeter, an ambient light sensor, a temperature sensor, and/or other sensors or combinations of sensors. In some implementations, the image capture device 200 may contain one or more other metadata/telemetry sources, e.g., image sensor parameters, battery monitor, storage parameters, and/or other information related to camera operation and/or capture of content. The metadata unit 232 may obtain information related to the environment of the image capture device 200 and aspects in which the content is captured.

For example, the metadata unit 232 may include an accelerometer that may provide device motion information including velocity and/or acceleration vectors representative of motion of the image capture device 200. In another example, the metadata unit 232 may include a gyroscope that may provide orientation information describing the orientation of the image capture device 200. In another example, the metadata unit 232 may include a GPS sensor that may provide GPS coordinates, time, and information identifying a location of the image capture device 200. In another example, the metadata unit 232 may include an altimeter that may obtain information indicating an altitude of the image capture device 200.

In some implementations, the metadata unit 232, or one or more portions thereof, may be rigidly coupled to the image capture device 200 such that motion, changes in orientation, or changes in the location of the image capture device 200 may be accurately detected by the metadata unit 232. Although shown as a single unit, the metadata unit 232, or one or more portions thereof, may be implemented as multiple distinct units. For example, the metadata unit 232 may include a temperature sensor as a first physical unit and a GPS unit as a second physical unit. In some implementations, the metadata unit 232, or one or more portions thereof, may be included in an image capture device 200 as shown, or may be included in a physically separate unit operatively coupled to, such as in communication with, the image capture device 200.

In some implementations, the optics unit 234 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations, the optics unit 234 may include a focus controller unit that may control the operation and configuration of the camera lens. The optics unit 234 may receive light from an object and may focus received light onto an image sensor 230. Although not shown separately in FIG. 2, in some implementations, the optics unit 234 and the image sensor 230 may be combined, such as in a combined physical unit, such as a housing.

In some implementations, the communication unit 240 may be coupled to the I/O unit 214 and may include a component (e.g., a dongle) having an infrared sensor, a radio frequency transceiver and antenna, an ultrasonic transducer, and/or other communications interfaces used to send and receive wireless communication signals. In some implementations, the communication unit 240 may include a local (e.g., Bluetooth, Wi-Fi) and/or broad range (e.g., cellular LTE) communications interface for communication between the image capture device 200 and a remote device (e.g., the user interface device 120 in FIG. 1). The communication unit 240 may communicate using, for example, Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. In some implementations, the communication unit 240 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 240 may be represented using formats including one or more of hypertext markup language (HTML), extensible markup language (XML), and/or other formats. One or more exchanges of information between the image capture device 200 and remote or external devices may be encrypted using encryption technologies including one or more of secure sockets layer (SSL), transport layer security (TLS), virtual private networks (VPNs), Internet Protocol security (IPsec), and/or other encryption technologies.

In some implementations, the one or more power systems 250 supply power to the image capture device 200. For example, for a small-sized, lower-power action camera a wireless power solution (e.g., battery, solar cell, inductive (contactless) power source, rectification, and/or other power supply) may be used.

Consistent with the present disclosure, the components of the image capture device 200 may be remote from one another and/or aggregated. For example, one or more sensor components may be distal from the image capture device 200, e.g., such as shown and described with respect to FIG. 1. Multiple mechanical, sensory, or electrical units may be controlled by a learning apparatus via network/radio connectivity.

Figure 3A:
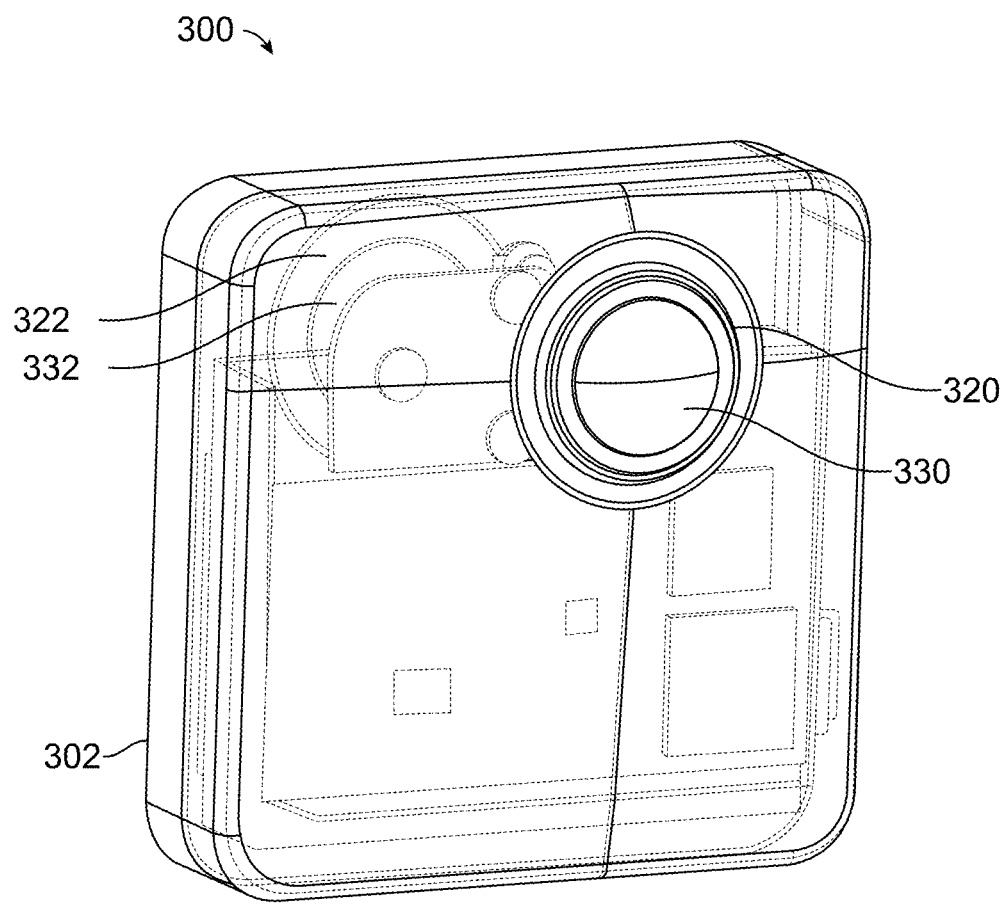
FIG. 3A illustrates a camera system capable of capturing spherical content.

FIG. 3A illustrates an image capture device 300 capable of capturing spherical content. The image capture device 300 includes a body 302 having two lenses 330 and 332 structured on front and back surfaces of the body 302, various indicators on the front and/or back surface of the camera body (such as LEDs, displays, and the like), various input mechanisms (such as buttons, switches, and touch-screen mechanisms), and electronics (e.g., imaging electronics, power electronics, etc.) internal to the body 302 for capturing images via the lenses 330 and 332 and/or performing other functions. The two lenses 330 and 332 are oriented in opposite directions and couple with two images sensors mounted on circuit boards within the body 302. Other electrical camera components (e.g., an image processor, camera SoC (system-on-chip), etc.) may also be included on a circuit board within the body 302.

An image capture device 300 may include a replaceable lens structure that allows an outer lens (e.g., the lens 330 or the lens 332) to be replaced without replacing an underlying lens barrel that includes one or more inner lenses which may be curved. For example, the outer lens 330 may be part of an interchangeable lens structure (e.g., the interchangeable lens structure 500 of FIG. 5A) with a retaining ring 320 configured to fasten the outer lens 330 in a position covering an end of a lens barrel in the body of the image capture device 300. For example, the outer lens 332 may be part of an interchangeable lens structure (e.g., the interchangeable lens structure 500 of FIG. 5A) with a retaining ring 322 configured to fasten the outer lens 332 in a position covering an end of a lens barrel in the body of the image capture device 300.

Figure 3B:
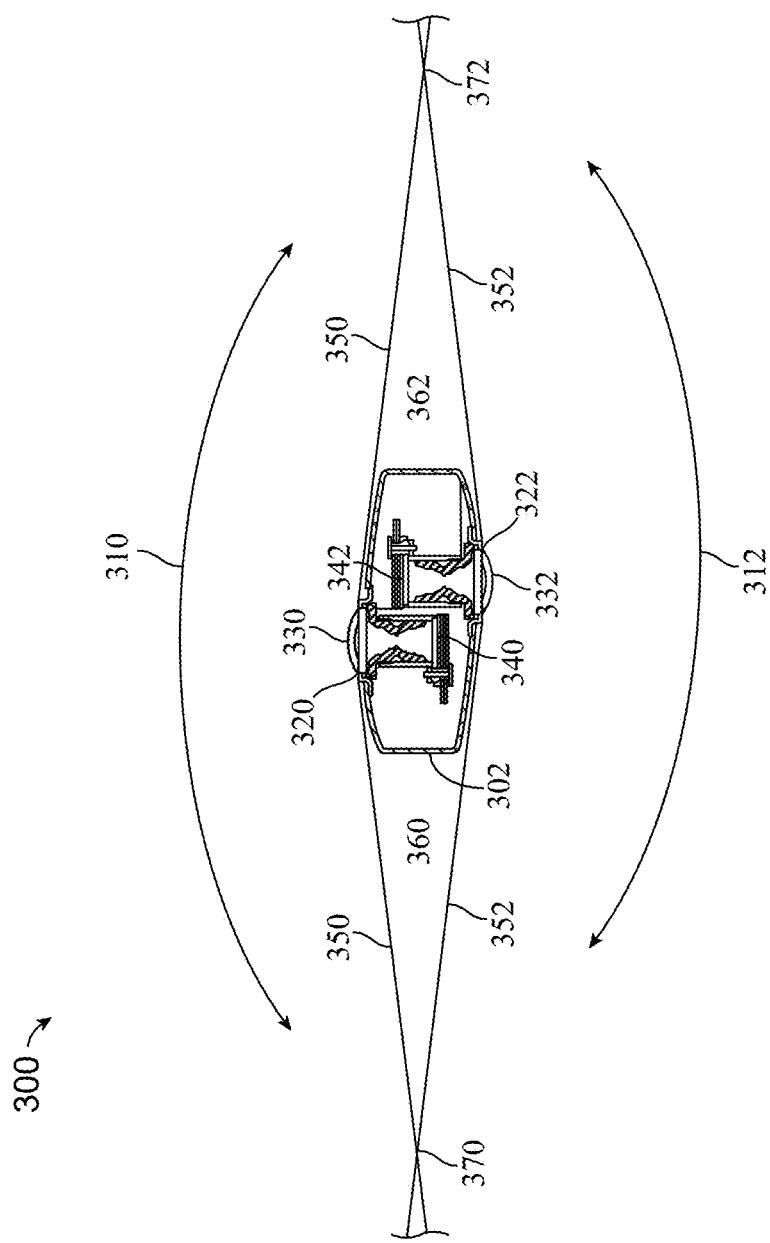
FIG. 3B is a cross-sectional view of an example of an image capture apparatus including overlapping fields-of-view.

FIG. 3B is a cross-sectional view of an example of a dual-lens image capture device 300 including overlapping fields-of-view 310, 312. In some implementations, the image capture device 300 may be a spherical image capture apparatus with fields-of-view 310, 312 as shown in FIG. 3. The image capture device 300 includes a first image sensor 340 mounted within the body 302, behind the first lens 330 and configured to capture images based on light incident on the first image sensor 340 through the first lens 330. The image capture device 300 includes a second image sensor 342 mounted within the body 302, behind the second lens 332 and configured to capture images based on light incident on the second image sensor 342 through the second lens 332. The first image sensor 340 and the second image sensor 342 may be arranged in a back-to-back or Janus configuration. The lenses 330 and 332 may be mounted on the body 302 of the image capture device 300 in their respective positions in relation to the first image sensor 340 and the second image sensor 342.

The first lens 330 of the image capture device 300 may have the field-of-view 310 shown above a boundary 350. Behind the first lens 330, the first image sensor 340 may capture a first hyper-hemispherical image plane from light entering the first lens 330, corresponding to the first field-of-view 310.

The second lens 332 of the image capture device 300 may have a field-of-view 312 as shown below a boundary 352. Behind the second lens 332, the second image sensor 342 may capture a second hyper-hemispherical image plane from light entering the second lens 332, corresponding to the second field-of-view 312.

In some implementations, one or more areas, such as blind spots 360, 362, may be outside of the fields-of-view 310, 312 of the lenses 330, 332, light may be obscured from the lenses 330, 332 and the respective image sensors 340, 342, and content in the blind spots 360, 362 may be omitted from capture. In some implementations, the image capture device 300 may be configured to minimize the blind spots 360, 362.

In some implementations, the fields-of-view 310, 312 may overlap. Stitch points 370, 372, proximal to the image capture device 300, at which the fields-of-view 310, 312 overlap may be referred to herein as overlap points or stitch points. Content captured by the respective lenses 330, 332, distal to the stitch points 370, 372, may overlap.

In some implementations, images contemporaneously captured by the respective image sensors 340, 342 may be combined to form a combined image. Combining the respective images may include correlating the overlapping regions captured by the respective image sensors 340, 342, aligning the captured fields-of-view 310, 312, and stitching the images together to form a cohesive combined image.

In some implementations, a small change in the alignment (e.g., position and/or tilt) of the lenses 330, 332, the image sensors 340, 342, or both may change the relative positions of their respective fields-of-view 310, 312 and the locations of the stitch points 370, 372. A change in alignment may affect the size of the blind spots 360, 362, which may include changing the size of the blind spots 360, 362 unequally.

In some implementations, incomplete or inaccurate information indicating the alignment of the image sensors 340, 342, such as the locations of the stitch points 370, 372, may decrease the accuracy, efficiency, or both of generating a combined image. In some implementations, the image capture device 300 may maintain information indicating the location and orientation of the lenses 330, 332 and the image sensors 340, 342 such that the fields-of-view 310, 312, stitch points 370, 372, or both may be accurately determined, which may improve the accuracy, efficiency, or both of generating a combined image.

In some implementations, optical axes through the lenses 330, 332 may be substantially antiparallel to each other, such that the respective axes may be within a tolerance such as 1°, 2°, 3°, and/or other tolerances. In some implementations, the image sensors 340, 342 may be substantially perpendicular to the optical axes through their respective lenses 330, 332, such that the image sensors may be perpendicular to the respective axes to within a tolerance such as 1°, 2°, 3°, and/or other tolerances.

In some implementations, the lenses 330, 332 may be laterally offset from each other, may be off-center from a central axis of the image capture device 300, or may be laterally offset and off-center from the central axis. As compared to an image capture apparatus with back-to-back lenses (e.g., lenses aligned along the same axis), the image capture device 300 including laterally offset lenses 330, 332 may include substantially reduced thickness relative to the lengths of the lens barrels securing the lenses 330, 332. For example, the overall thickness of the image capture device 300 may be close to the length of a single lens barrel as opposed to twice the length of a single lens barrel as in a back-to-back configuration. Reducing the lateral distance between the lenses 330, 332 may improve the overlap in the fields-of-view 310, 312.

In some implementations, images or frames captured by an image capture apparatus, such as the image capture apparatus 110 shown in FIG. 1 or the image capture device 300 shown in FIGS. 3A-3B, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitching boundary may be matched accurately to minimize boundary discontinuities.

Figure 4:
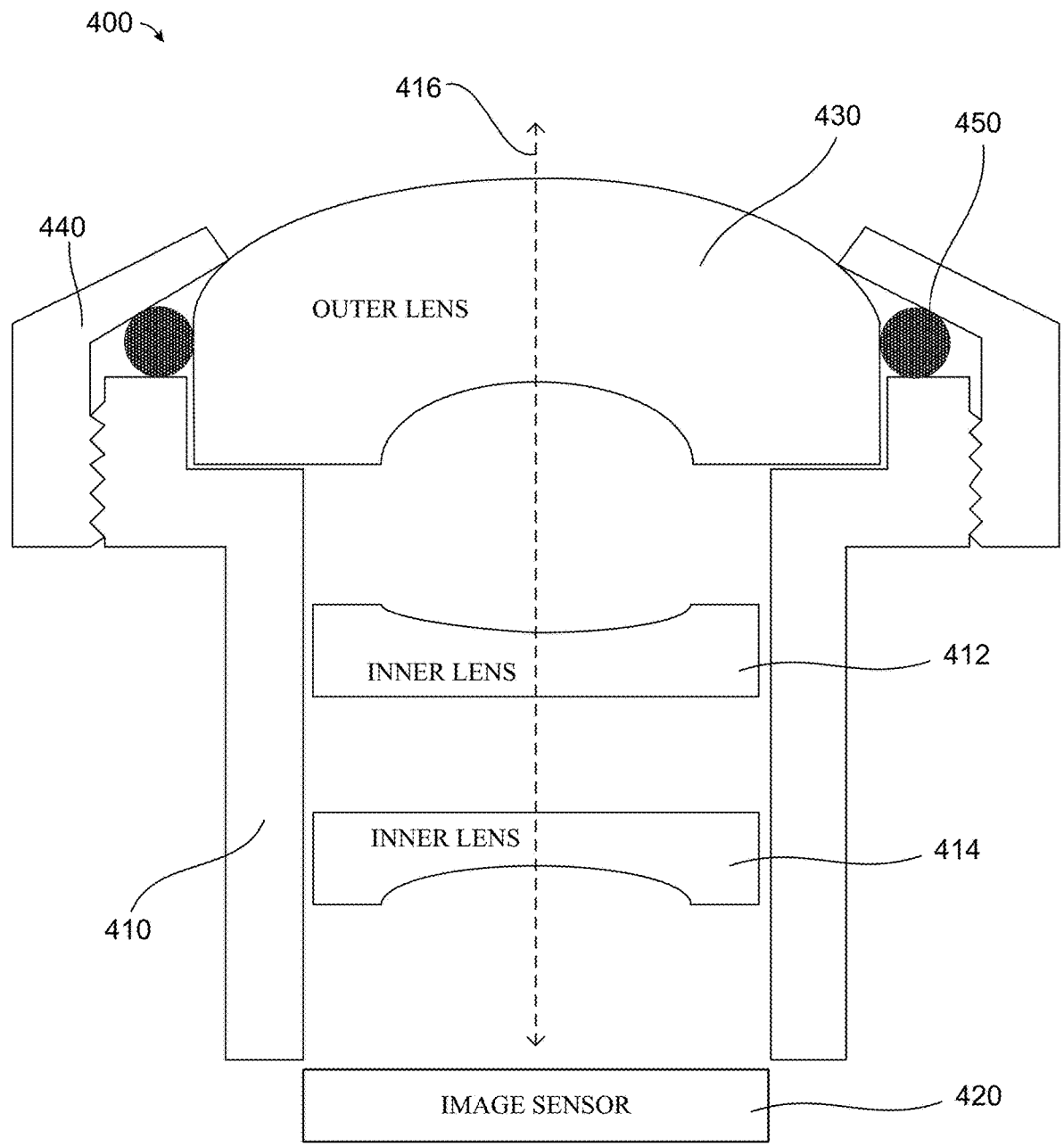
FIG. 4 illustrates a cross-sectional side view of an example of an interchangeable lens structure mounted over a lens barrel, over an image sensor.

FIG. 4 illustrates a cross-sectional side view of an example of system 400 including an interchangeable lens structure mounted over a lens barrel, over an image sensor. The system 400 includes a lens barrel 410 including a multiple inner lense 412 and 414; an image sensor 420; a replaceable lens structure including an outer lens 430 and a retaining ring 440; and an O-ring 450 for waterproofing. For example, the system 400 may be implemented as part of an image capture device, such as the image capture device 130 of FIG. 1 or the image capture device 300 of FIGS. 3A-3B.

The system 400 includes a lens barrel 410 a lens barrel in a body of an image capture device. The lens barrel 410 may be an integrated part of a body of an image capture device. The lens barrel 410 includes multiple inner lenses 412 and 414. The lens barrel 410 includes a curved inner lens 412. The curved inner lens 414 may refract light propagating through the lens barrel 410 to focus the light for capture by the image sensor 420. The lens barrel 410 includes a second curved inner lens 414. For example, the inner lenses 412 and 414 may be attached (e.g., using glue and/or ledges and flanges (not shown)) to inner walls of the lens barrel 410. The inner lenses 412 and 414 may be oriented to direct light from a first end of the lens barrel 410, roughly parallel to an optical axis 416 of the lens barrel 410 to a second end of the lens barrel 410, where the light may be detected by the image sensor 420 to capture an image.

The system 400 includes a replaceable lens structure that is mountable on a body of the image capture device (e.g., image capture device 130 or the image capture device 300). The replaceable lens structure includes an outer lens 430 and a retaining ring 440 configured to fasten the outer lens 430 in a position covering a first end the lens barrel 410 in a first arrangement and configured to disconnect the outer lens 430 from the body of the image capture device in a second arrangement. The outer lens 430 may be configured (e.g., shaped and/or positioned) to facilitate capture of images with a desired field of view (e.g., a 90 degree field of view, a 135 degree field of view, or a 180 degree field of view). For example, the outer lens 430 may be a curved lens. For example, the outer lens 430 may be a fisheye lens. For example, the outer lens 430 may be a hyperhemispherical lens. In some implementations, the retaining ring 440 is glued to the outer lens 430. In some implementations, the outer lens 430 is secured in the retaining ring 440 as a captured mount, such that the outer lens 430 may be rotated within the retaining ring 440. For example, the outer lens 430 and the retaining ring 440 may be interlocked (e.g., using a flange and slot interface around a circumference of the outer lens 430) and travel together but the outer lens 430 may still be loose enough to turn inside the retaining ring 440 independently. In some implementations, the retaining ring 440 is firmly held in a fixed orientation in the first arrangement by a friction lock formed by pressing the retaining ring 440 against the outer lens 430 in its position covering the first end of the lens barrel 410. For example, the process 900 of FIG. 9 may be performed to replace the replaceable lens structure including the outer lens 430 and the retaining ring 440.

Figure 8:
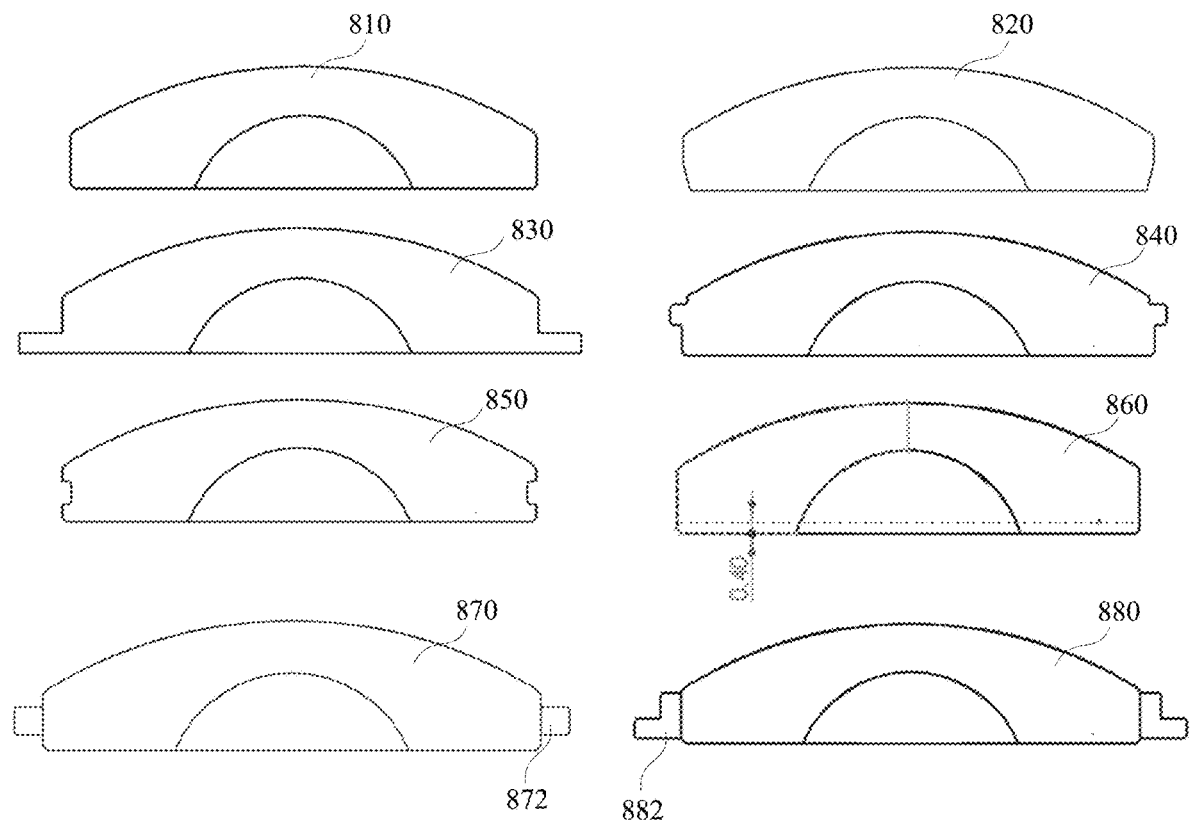
FIG. 8 illustrates a cross-sectional side view of an examples of outer lenses.

In some implementations (not shown in FIG. 4), the outer lens may be replaced by an outer lens such as one of the outer lenses described in relation to FIG. 8.

The retaining ring 440 may include a fastening mechanism configured to facilitate transition between the first arrangement and the second arrangement by removably fastening the retaining ring 440 to the lens barrel 410 or another nearby portion of the body of the image capture device. In the example depicted in FIG. 4, a threaded mechanism is employed to fasten the retaining ring 440 to the lens barrel 410 and fasten the outer lens 430 in a position covering a first end the lens barrel 410. In some implementations (not shown in FIG. 4), a retaining ring 440 may employ other fastening mechanisms to secure a retaining ring to a body of an image capture device. For example, a retaining ring may include a bayonet mechanism (e.g., such as the bayonet mechanism described in relation to FIG. 5A) configured to facilitate transition between the first arrangement and the second arrangement. For example, a retaining ring may include a threaded mechanism (e.g., such as the threaded mechanism described in relation to FIG. 5B) configured to facilitate transition between the first arrangement and the second arrangement. For example, a retaining ring may include a snap-ring mechanism (e.g., such as the snap-ring mechanism described in relation to FIG. 5C) configured to facilitate transition between the first arrangement and the second arrangement. For example, a retaining ring may include screw holes that enable screws to fasten the retaining ring to the body in the first arrangement (e.g., as described in relation to FIG. 5D).

The system 400 includes an image sensor 420 mounted within a body of an image capture device at a second end of the lens barrel 410. The image sensor 420 may be configured to capture images based on light incident on the image sensor through the outer lens 430 and the multiple inner lenses 412 and 414 when the retaining ring 440 is in the first arrangement. The image sensor 420 may be configured to capture images based on light incident on the image sensor through the outer lens 430 and a curved inner lens 412 when the retaining ring 440 is in the first arrangement. The image sensor 420 may be configured to detect light of a certain spectrum (e.g., the visible spectrum or the infrared spectrum) and convey information constituting an image as electrical signals (e.g., analog or digital signals). For example, the image sensor 420 may include charge-coupled devices (CCD) or active pixel sensors in complementary metal-oxide-semiconductor (CMOS). In some implementations, the image sensor 420 includes a digital to analog converter. For example, the image sensor 420 may be configured to capture image data using a plurality of selectable exposure times.

The system 400 includes a waterproofing O-ring 450 that is positioned radially around the outer lens 430. The O-ring may be composed of a rubbery material. For example, the O-ring 450 may be positioned to be compressed between the retaining ring 440, the outer lens 430 and the body (e.g., the lens barrel 410) of the image capture device to form a waterproofing seal (e.g., as described in relation to FIGS. 6A-B). In some implementations, the O-ring 450 may be glued to the retaining ring 440 and/or to the outer lens 430.

In some implementations (not shown in FIG. 4), a waterproofing O-ring that may be positioned inside the outer lens 430, between the outer lens 430 and the lens barrel 410. For example the O-ring may be positioned and compressed along the direction of the optical axis 416 (e.g., vertically) between the outer lens 430 and the lens barrel 410. In some implementations (not shown in FIG. 4), waterproofing may be provided by a ring of heat set glue (e.g., as described in relation to FIGS. 7A-B).

FIG. 5A illustrates an example of an interchangeable lens structure 500 including a bayonet mechanism. The interchangeable lens structure 500 includes a lens barrel 510 (e.g., similar to the lens barrel 410 of FIG. 4), which may include one or more inner lenses that may be curved. The lens barrel 510 is part of a body of an image capture device that includes a male bayonet ring 512, which may be attached or otherwise integrated with the lens barrel 510 or another portion of the body. The interchangeable lens structure 500 includes a retaining ring 514 that includes a female bayonet ring. For example, the retaining ring 514 may be pushed onto the male bayonet ring of the body in an unlocked position and turned to a locked position to fasten the retaining ring 514 to the body and fasten an outer lens 516 (e.g., one of the lens depicted in FIG. 8) in a position covering a first end of the lens barrel 510. The interchangeable lens structure 500 includes an O-ring 518 that may be positioned radially around the outer lens 516 and compressed between the retaining ring 514 and the outer lens 516 and/or the body to waterproof the interchangeable lens structure 500. For example, the retaining ring 514, the outer lens 516, and/or the O-ring 518 may be replaced using the process 900 of FIG. 9. The interchangeable lens structure 500 may offer advantages over alternative lens assemblies, such as robust reusability over many cycles of removing and replacing an outer lens, over-center locking, an enhanced user experience (e.g., easy to remove/replace), and the retaining ring maybe made sturdy out of a strong metal. A drawback may be a relatively large outer diameter of the retaining ring 514.

Figure 5B:
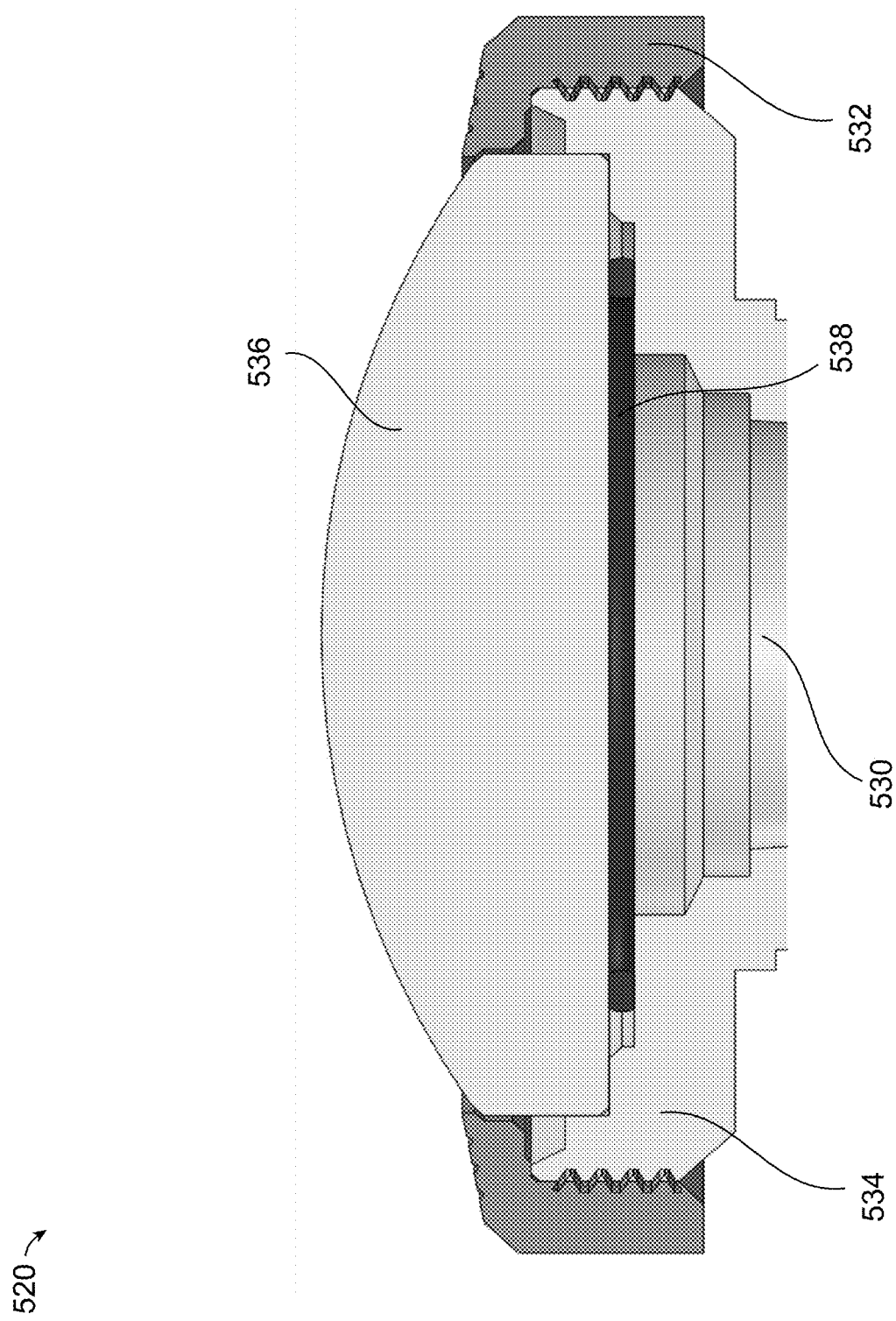
FIG. 5B illustrates an example of an interchangeable lens structure including a threaded mechanism.

FIG. 5B illustrates an example of an interchangeable lens structure 520 including a threaded mechanism. The interchangeable lens structure 520 includes a lens barrel 530 (e.g., similar to the lens barrel 410 of FIG. 4), which may include one or more inner lenses that may be curved. The lens barrel 530 is part of a body of an image capture device that includes a male threaded interface 534, which may be attached or otherwise integrated with the lens barrel 530 or another portion of the body. The interchangeable lens structure 520 includes a retaining ring 532 that includes a female threaded interface. For example, the retaining ring 532 may be twisted onto the male threaded interface 534 of the body to fasten the retaining ring 532 to the body and fasten an outer lens 536 (e.g., one of the lens depicted in FIG. 8) in a position covering a first end of the lens barrel 530. The interchangeable lens structure 520 includes an O-ring 538 that may be positioned inside (e.g., vertically under) the outer lens 536 and compressed between the outer lens 536 and the body (e.g., the lens barrel 530) to waterproof the interchangeable lens structure 520. For example, the retaining ring 532, the outer lens 536, and/or the O-ring 538 may be replaced using the process 900 of FIG. 9. The interchangeable lens structure 520 may offer advantages over alternative lens assemblies, such as a low profile. A drawback may be a risk of cross threading or stripping.

Figure 5C:
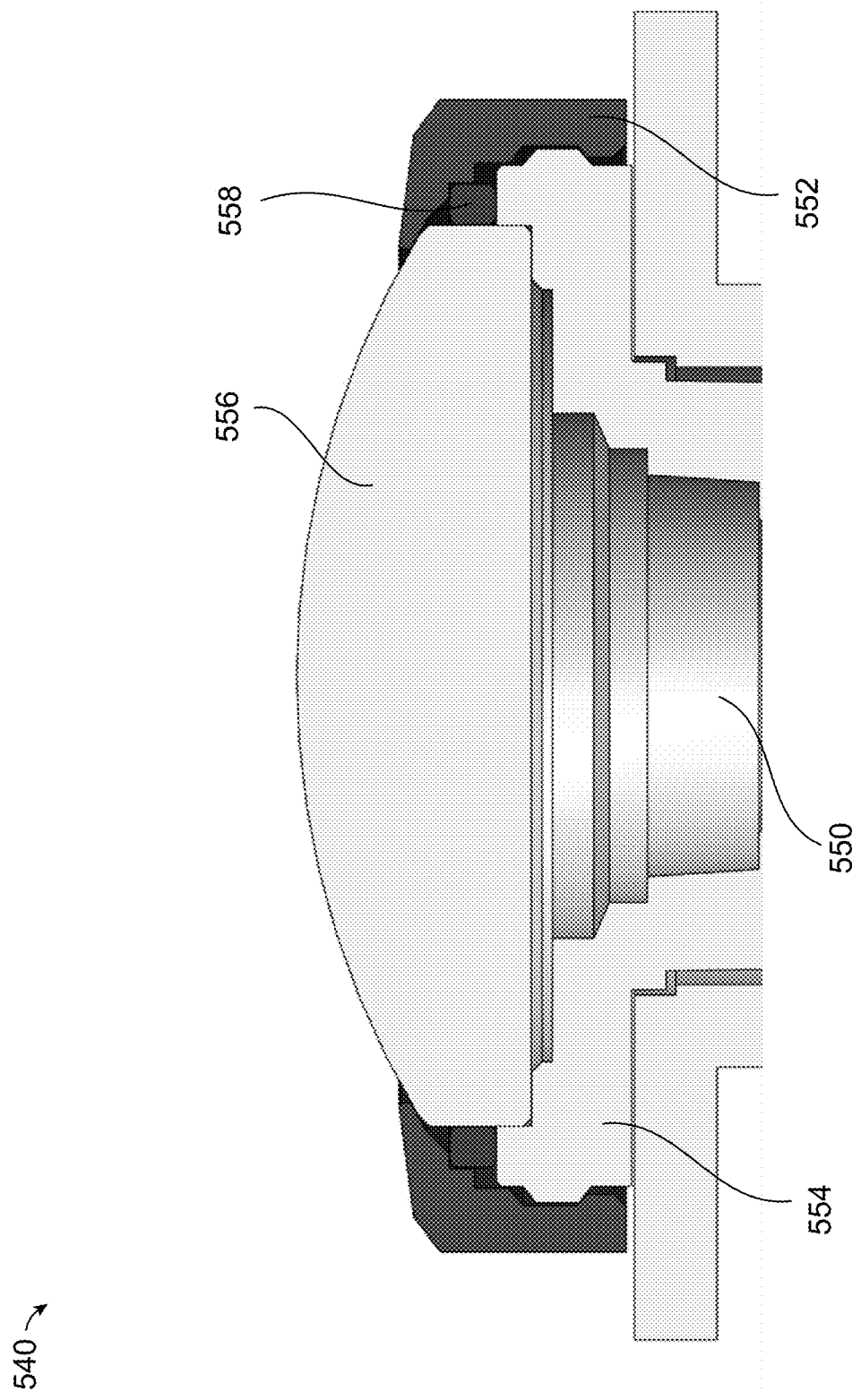
FIG. 5C illustrates an example of an interchangeable lens structure including a snap-ring mechanism.

FIG. 5C illustrates an example of an interchangeable lens structure 540 including a snap-ring mechanism. The interchangeable lens structure 540 includes a lens barrel 550

(e.g., similar to the lens barrel 410 of FIG. 4), which may include one or more inner lenses that may be curved. The lens barrel 550 is part of a body of an image capture device that includes a male snap-ring interface 554, which may be attached or otherwise integrated with the lens barrel 550 or another portion of the body. The interchangeable lens structure 540 includes a retaining ring 552 that includes a female snap-ring interface. For example, the retaining ring 552 may be pushed onto the male snap-ring interface 554 of the body to fasten the retaining ring 552 to the body and fasten an outer lens 556 (e.g., one of the lens depicted in FIG. 8) in a position covering a first end of the lens barrel 550. The interchangeable lens structure 540 includes an O-ring 558 that may be positioned radially around the outer lens 556 and compressed between the retaining ring 552 and the outer lens 556 and/or the body to waterproof the interchangeable lens structure 540. For example, the retaining ring 552, the outer lens 556, and/or the O-ring 558 may be replaced using the process 900 of FIG. 9. The interchangeable lens structure 540 may offer advantages over alternative lens assemblies, such as ease of installation. A drawback may be difficulty removing the retaining ring 552.

Figure 5D:
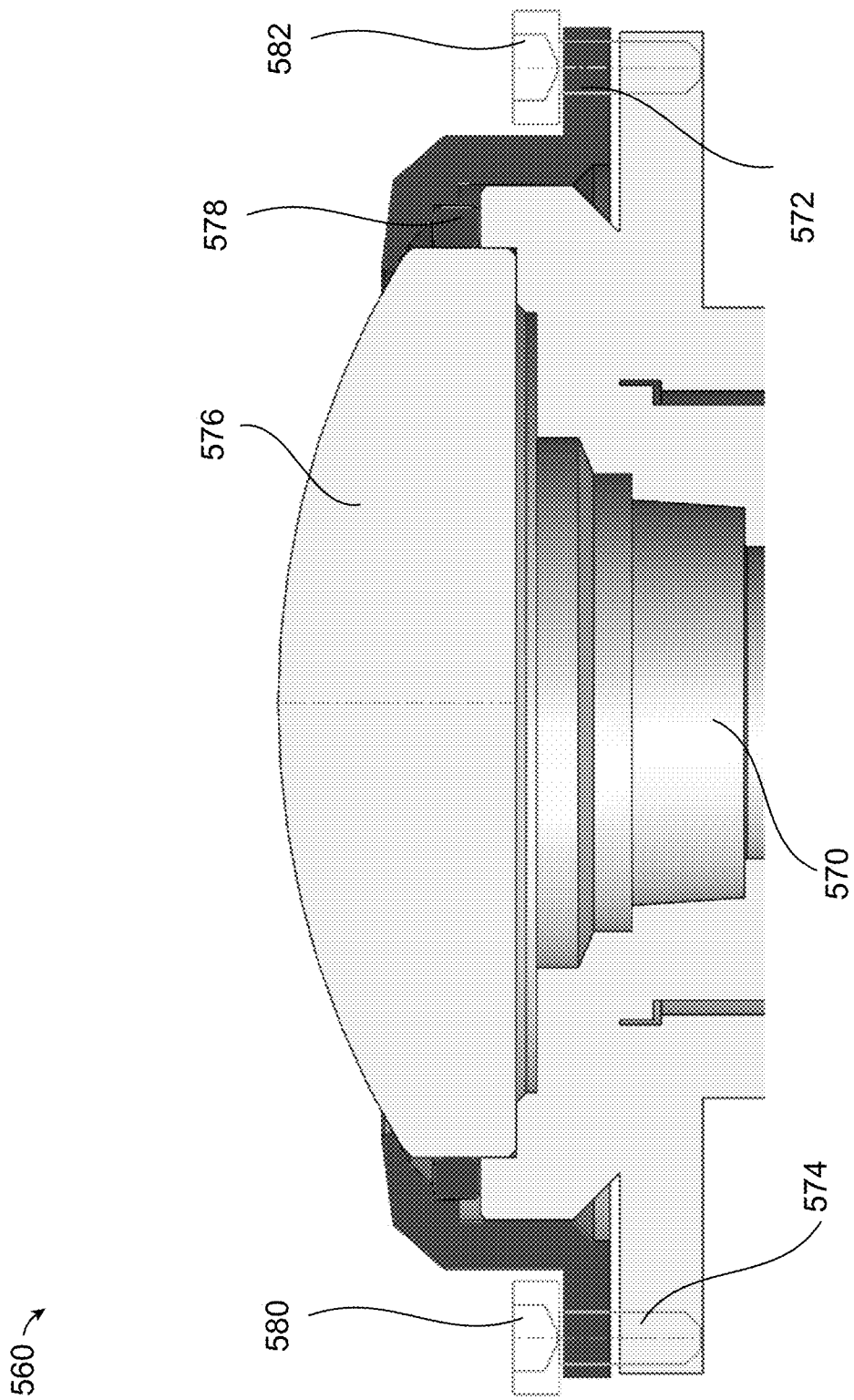
FIG. 5D illustrates an example of an interchangeable lens structure including screw holes.

FIG. 5D illustrates an example of an interchangeable lens structure 560 including screw holes. The interchangeable lens structure 560 includes a lens barrel 570 (e.g., similar to the lens barrel 410 of FIG. 4), which may include one or more inner lenses that may be curved. The lens barrel 570 is part of a body of an image capture device that includes screw holes 574, which may be attached or otherwise integrated with the lens barrel 570 or another portion of the body. The interchangeable lens structure 560 includes a retaining ring 572 that includes screw holes. For example, the retaining ring 572 may be fastened to body by driving screws 580 and 582 through the screw holes of the retaining ring 572, into the screw holes 574 of the body to fasten an outer lens 576 (e.g., one of the lens depicted in FIG. 8) in a position covering a first end of the lens barrel 570. The interchangeable lens structure 560 includes an O-ring 578 that may be positioned radially around the outer lens 576 and compressed between the retaining ring 572 and the outer lens 576 and/or the body to waterproof the interchangeable lens structure 560. For example, the retaining ring 572, the outer lens 576, and/or the O-ring 578 may be replaced using the process 900 of FIG. 9. The interchangeable lens structure 560 may offer advantages over alternative lens assemblies, such as robust fastening of the retaining ring 572 and the outer lens 576 into position. A drawback may be a large size and poor aesthetics of the retaining ring 572.

FIG. 6A illustrates an exploded view of an example of an interchangeable lens structure 600 with radial o-ring. FIG. 6B illustrates a side view of an example of the interchangeable lens structure 600 with a radial o-ring. The interchangeable lens structure 600 includes an outer lens 610 (e.g., one of the lens depicted in FIG. 8), a retaining ring 620, and an o-ring 630. The retaining ring 620, the o-ring 630, and the outer lens may stacked as shown in FIG. 6A, with the o-ring 630 fitting and being compressed radially between the outer lens 610 and the retaining ring 620. A fastening mechanism (e.g., threads) of the retaining ring 620 may then be used fasten these components in a position covering a first end of a lens barrel 640. In this position, the o-ring may be further compressed between the retaining ring 620 and the lens barrel 640 of the body. For example, the compressed o-ring 630 may provide a water seal to a depth of 10 meters with 1 mm=0.23 mm compression.

FIG. 7A illustrates an exploded view of an example of an interchangeable lens structure 700 with radial glue. FIG. 7B illustrates a side view of an example of the interchangeable lens structure 700 with radial glue that has been set. The interchangeable lens structure 700 includes an outer lens 710 (e.g., one of the lens depicted in FIG. 8), a retaining ring 720, and a ring of glue 730. The retaining ring 720, the ring of glue 730, and the outer lens may stacked as shown in FIG. 7A, with the ring of glue 730 fitting radially between the outer lens 710 and the retaining ring 720. The ring of glue 730 may be set (e.g., by applying heat or a laser) to secure the outer lens 710 to the retaining ring 720 and to provide waterproof seal. A fastening mechanism (e.g., threads) of the retaining ring 720 may then be used fasten these components in a position such that the outer lens 710 covers a first end of a lens barrel 740. For example, the set ring of glue 730 may provide a water seal to a depth of 6 meters.

FIG. 8 illustrates a cross-sectional side view of an examples of outer lenses. The outer lens 810 has a cylindrical outer diameter. The outer lens 820 has a conical chamfer on its outer diameter. The outer lens 830 has a lower flange (upper cut). The outer lens 840 has a middle flange (upper cut and lower cut). The outer lens 850 has a middle cut (upper cut). For example, the outer lens 850 may be captured by a retaining ring with a snap-fit mechanism. The outer lens 860 has a cylindrical outer diameter with a greater thickness than the outer lens 810.

The outer lens 870 is mounted to a ring 872 with glue. For example, the ring 872 may have thickness or height of 1 mm. The outer lens 880 is mounted to a ring 882 with glue. For example, the ring 872 may have thickness or height of 1.75 mm. In some implementations, a ring glued to an outer lens can have a larger thickness or height than the outer diameter of the outer lens. In some implementations, a ring can be mounted to an outer lens with shrink-fit. In some implementations, a ring can be mounted to an outer lens with shrink-fit. In some implementations (not shown), a ring can be mounted to an outer lens with shrink-fit.

Figure 9:
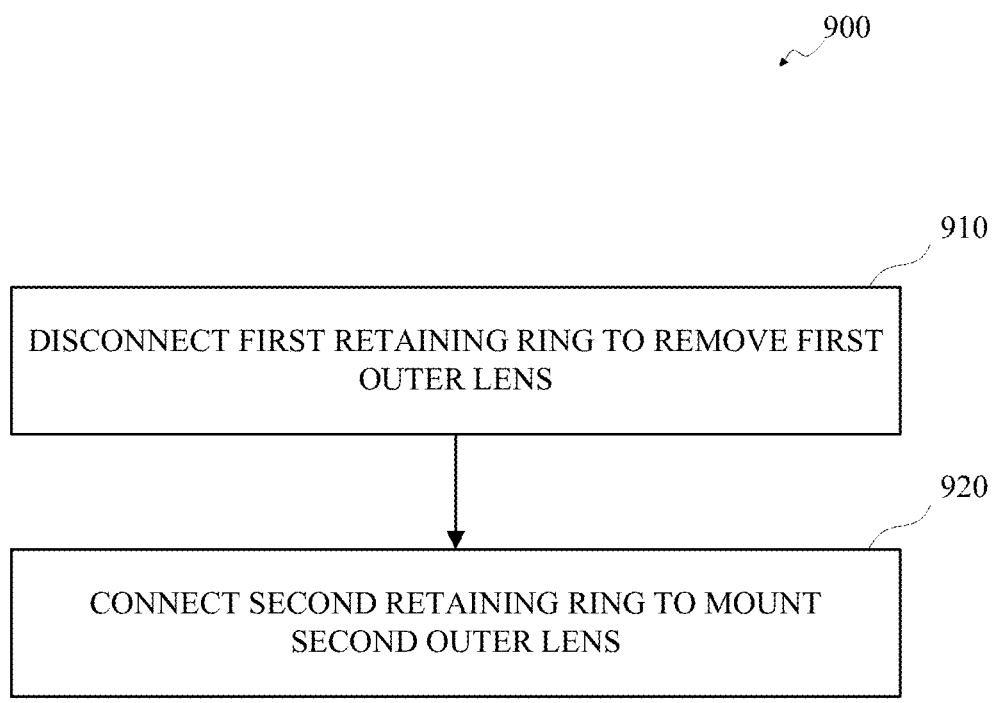
FIG. 9 is a flowchart of an example process for replacing an outer lens mounted over a lens barrel.

FIG. 9 is a flowchart of an example process 900 for replacing an outer lens mounted over a lens barrel. The process 900 includes disconnecting 910 a first retaining ring from a body of an image capture device to remove a first outer lens from a position covering a first end of a lens barrel, and connecting 920 a second retaining ring to the body of the image capture device to mount a second outer lens in a position covering the first end the lens barrel. For example, the process 900 may be performed using the system 400 of FIG. 4. For example, the process 900 may be performed using the interchangeable lens structure 500 of FIG. 5A. For example, the process 900 may be performed using the interchangeable lens structure 520 of FIG. 5B. For example, the process 900 may be performed using the interchangeable lens structure 540 of FIG. 5C. For example, the process 900 may be performed using the interchangeable lens structure 560 of FIG. 5D. For example, the process 900 may be performed by an end user of the image capture device as a do-it-yourself repair or maintenance operation. For example, the process 900 may be performed by a technician.

The process 900 includes disconnecting 910 a first retaining ring from a body of an image capture device to remove a first outer lens from a position covering a first end of a lens barrel. For example, the lens barrel may include multiple inner lenses. For example, the lens barrel may include at least one curved inner lens. For example, where the first retaining ring includes a bayonet mechanism (e.g., as described in relation to FIG. 5A), disconnecting 910 the first retaining ring from the body may include twisting the first retaining ring from a locked to an unlocked position, and pulling the retaining ring away from the body to remove the first outer lens from a position covering a first end of a lens barrel. For example, where the first retaining ring includes a threaded mechanism (e.g., as described in relation to FIG. 5B), disconnecting 910 the first retaining ring from the body may include twisting the first retaining ring counterclockwise, and pulling the retaining ring away from the body to remove the first outer lens from a position covering a first end of a lens barrel. For example, where the first retaining ring includes a snap-ring mechanism (e.g., as described in relation to FIG. 5C), disconnecting 910 the first retaining ring from the body may include prying the first retaining ring away from the body (e.g., using fingers and/or a screwdriver) to remove the first outer lens from a position covering a first end of a lens barrel. For example, where the first retaining ring includes a screw holes (e.g., as described in relation to FIG. 5D), disconnecting 910 the first retaining ring from the body may include unscrewing screws through the screw holes, and pulling the retaining ring away from the body to remove the first outer lens from a position covering a first end of a lens barrel.

The process 900 includes connecting 920 a second retaining ring to the body of the image capture device to mount a second outer lens (e.g. a new outer lens) in a position covering the first end the lens barrel. For example, an image sensor may be mounted within the body at a second end of the lens barrel and configured to capture images based on light incident on the image sensor through the second outer lens and the one or more inner lenses of the lens barrel. In some implementations, the first outer lens is glued to the first retaining ring, and the second outer lens is glued to the second retaining ring. For example, where the second retaining ring includes a bayonet mechanism (e.g., as described in relation to FIG. 5A), connecting 920 the second retaining ring to the body may include pushing the retaining ring onto the body and twisting the second retaining ring from an unlocked to a locked position to mount the second outer lens in a position covering the first end the lens barrel. For example, where the second retaining ring includes a threaded mechanism (e.g., as described in relation to FIG. 5B), connecting 920 the second retaining ring to the body may include twisting the second retaining ring clockwise to mount the second outer lens in a position covering the first end the lens barrel. For example, where the second retaining ring includes a snap-ring mechanism (e.g., as described in relation to FIG. 5C), connecting 920 the second retaining ring to the body may include snapping the second retaining ring onto the body (e.g., using fingers) to mount the second outer lens in a position covering the first end the lens barrel. For example, where the second retaining ring includes a screw holes (e.g., as described in relation to FIG. 5D), connecting 920 the second retaining ring to the body may include screwing screws through the screw holes into the body to mount the second outer lens in a position covering the first end the lens barrel.

In the present specification, an implementation showing a singular component should not be considered limiting; rather, the disclosure is intended to encompass other implementations including a plurality of the same component, and vice-versa, unless explicitly stated otherwise herein. Further, the present disclosure encompasses present and future known equivalents to the components referred to herein by way of illustration. For example, the replaceable outer lens systems and techniques described herein may be applied to any number of lenses on an image capture device, such as multiple lenses for depth capture, or potentially to allow shorter TTL lenses (with smaller image sensors) that are then fused together to create the total light gathering power of a larger sensor/lens combination.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy.

The above-described implementations and examples have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. An image capture device comprising:
   a lens barrel in a body of the image capture device, the lens barrel including multiple inner lenses;
   a replaceable lens structure that is mountable on the body of the image capture device, the replaceable lens structure including an outer lens and a retaining ring configured to fasten the outer lens in a position covering a first end of the lens barrel in a first arrangement and configured to disconnect the outer lens from the body of the image capture device in a second arrangement, in which the retaining ring includes a bayonet mechanism configured to facilitate transition between the first arrangement and the second arrangement; and
   an image sensor mounted within the body at a second end of the lens barrel and configured to capture images based on light incident on the image sensor through the outer lens and the multiple inner lenses when the retaining ring is in the first arrangement.

2. The image capture device of claim 1, in which the outer lens is a curved lens.

3. The image capture device of claim 1, in which the outer lens is a fisheye lens.

4. The image capture device of claim 1, in which the retaining ring is glued to the outer lens.

5. The image capture device of claim 1, in which the outer lens is secured in the retaining ring as a captured mount, such that the outer lens may be rotated within the retaining ring.

6. The image capture device of claim 1, in which at least one of the multiple inner lenses is a curved lens.

7. The image capture device of claim 1, comprising:
   a waterproofing O-ring that is positioned radially around the outer lens.

8. The image capture device of claim 1, comprising:
   a waterproofing O-ring that is positioned inside the outer lens, between the outer lens and the lens barrel.

9. A method comprising:
   disconnecting a first retaining ring from a body of an image capture device to remove a first outer lens from a position covering a first end of a lens barrel, the lens barrel including multiple inner lenses, in which the first retaining ring includes a first bayonet mechanism and disconnecting the first retaining ring from the body comprises twisting the first retaining ring from a locked position to an unlocked position and pulling the first retaining ring away from the body to remove the first outer lens from a position covering the first end of the lens barrel; and connecting a second retaining ring to the body of the image capture device to mount a second outer lens in a position covering the first end the lens barrel, in which an image sensor is mounted within the body at a second end of the lens barrel and configured to capture images based on light incident on the image sensor through the second outer lens and the multiple inner lenses.

10. The method of claim 9, in which at least one of the multiple inner lenses is a curved lens.

11. An image capture device comprising:
a lens barrel in a body of the image capture device, the lens barrel including a curved inner lens;
a replaceable lens structure that is mountable on the body of the image capture device, the replaceable lens structure including an outer lens and a retaining ring configured to fasten the outer lens in a position covering a first end the lens barrel in a first arrangement and configured to disconnect the outer lens from the body of the image capture device in a second arrangement, in which the retaining ring includes a bayonet mechanism configured to facilitate transition between the first arrangement and the second arrangement;
and an image sensor mounted within the body at a second end of the lens barrel and configured to capture images based on light incident on the image sensor through the outer lens and the curved inner lens when the retaining ring is in the first arrangement.

12. The image capture device of claim 11, in which the outer lens is a curved lens.

13. The image capture device of claim 11, in which the retaining ring is glued to the outer lens.

14. The image capture device of claim 11, in which the outer lens is a fisheye lens.

15. The image capture device of claim 11, in which the outer lens is secured in the retaining ring as a captured mount, such that the outer lens may be rotated within the retaining ring.

16. The image capture device of claim 11, comprising:
a waterproofing O-ring that is positioned radially around the outer lens.

17. The image capture device of claim 11, comprising:
a waterproofing O-ring that is positioned inside the outer lens, between the outer lens and the lens barrel.

18. The method of claim 9, in which in which the second retaining ring includes a second bayonet mechanism and connecting the second retaining ring to the body comprises:
pushing the retaining ring onto the body and twisting the second retaining ring from an unlocked to a locked position to mount the second outer lens in a position covering the first end the lens barrel.

19. The method of claim 9, in which the first outer lens is secured in the first retaining ring as a captured mount, such that the first outer lens may be rotated within the first retaining ring.

20. The method of claim 9, in which the first outer lens is a fisheye lens.

* * * * *